(12) United States Patent
Hsu et al.

(10) Patent No.: US 8,474,980 B2
(45) Date of Patent: Jul. 2, 2013

(54) PROJECTION AUTOSTEREOSCOPIC DISPLAY AND STEREO SCREEN

(75) Inventors: Wei-Liang Hsu, Taipei (TW); Chao-Hsu Tsai, Hsinchu (TW); Chang-Ying Chen, Kaohsiung (TW); Jinn-Cherng Yang, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 302 days.

(21) Appl. No.: 13/085,486

(22) Filed: Apr. 13, 2011

(65) Prior Publication Data
US 2011/0317129 A1    Dec. 29, 2011

Related U.S. Application Data

(63) Continuation-in-part of application No. PCT/CN2010/074617, filed on Jun. 28, 2010.

(30) Foreign Application Priority Data

Dec. 23, 2010 (TW) .................................. 99145567 A

(51) Int. Cl.
*G03B 21/60* (2006.01)
*G02B 27/26* (2006.01)

(52) U.S. Cl.
USPC ................... 353/8; 353/20; 359/464; 359/458

(58) Field of Classification Search
USPC ..... 353/7, 10, 20; 359/458, 464, 465; 349/15; 348/58
See application file for complete search history.

(56) References Cited

U.S. PATENT DOCUMENTS 6,064,521 A * 5/2000 Burke .......................... 359/443
6,181,303 B1   1/2001 Johnson et al.
6,301,044 B1 * 10/2001 Huber et al. ............. 359/485.03

(Continued)

FOREIGN PATENT DOCUMENTS

| CN | 201199289 Y | 2/2009 |
| JP | 2008-521041 | 6/2008 |
| TW | 417038 | 1/2001 |

OTHER PUBLICATIONS

"First Office Action of China Counterpart Application", issued on Oct. 31, 2012, p. 1-p. 6, in which the listed references were cited.
Chen et al, "The Novel Projection Type Auto-Stereoscopic 3D Display", Taiwan Display Conference, Apr. 29, 2010, pp. 553-556, Taiwan, R.O.C.

(Continued)

*Primary Examiner* — William C Dowling
(74) *Attorney, Agent, or Firm* — Jianq Chyun IP Office

(57) ABSTRACT

A projection autostereoscopic display including an image projector and a stereo screen is provided. The image projector projects an image. The image includes multiple viewing-zone images. The stereo screen receives the image and reflects the image to an observing direction. The stereo screen includes a linear polarizer layer, for receiving and polarizing the image. A first microretarder layer is disposed behind the linear polarizer layer. A second microretarder layer is disposed behind the first microretarder layer by a distance. A reflection-type polarization-reserved diffuser layer is disposed behind the second microretarder layer for reflecting and diffusing the image into various directions while maintaining the polarization state of the image. A switching layer is switched between a transparent state which maintains the polarization state of the image and an opaque state which changes the polarization states of the image to a non-polarization state, to switch between 2D and 3D display modes.

26 Claims, 20 Drawing Sheets

U.S. PATENT DOCUMENTS

| | | | |
|---|---|---|---|
| 6,542,296 B2 | 4/2003 | Lee et al. | |
| 7,168,808 B2 | 1/2007 | Perlin et al. | |
| 7,230,759 B2 * | 6/2007 | Huang et al. | 359/465 |
| 7,347,558 B2 | 3/2008 | Berman | |
| 7,400,377 B2 | 7/2008 | Evans et al. | |
| 7,414,782 B2 * | 8/2008 | Jung | 359/465 |
| 7,898,568 B2 * | 3/2011 | Kim | 348/57 |
| 7,920,216 B2 * | 4/2011 | Hsu et al. | 349/15 |
| 8,125,582 B2 * | 2/2012 | Wu et al. | 349/15 |
| 8,240,854 B2 * | 8/2012 | Krijn et al. | 353/8 |
| 2003/0133191 A1 | 7/2003 | Morita et al. | |
| 2006/0291050 A1 | 12/2006 | Shestak et al. | |
| 2010/0033680 A1 | 2/2010 | Krijn et al. | |

OTHER PUBLICATIONS

Mphepö et al., "An Autosteresoscopic 3D Display System Based on Prism Patterned Projection Screen", Journal of Display Technology, Mar. 2010, pp. 94-97, vol. 6, No. 3.

Wang et al, "An Autostereoscopic 3D Projector Based on Two Parallax Barriers", SID Symposium Digest of Technical Papers, Jun. 30, 2009, pp. 619-621, vol. 40, Issue 1.

Kaneko et al, "Desktop autostereoscopic display using compact LED projector", Proc. of SPIE, May 30, 2003, pp. 109-117, vol. 5006.

* cited by examiner

PROJECTION AUTOSTEREOSCOPIC DISPLAY AND STEREO SCREEN

CROSS-REFERENCE TO RELATED APPLICATION

This application is a continuation application in part of international application serial no. PCT/CN2010/074617, filed on Jun. 28, 2010. This application also claims the priority benefit of Taiwan application Ser. No. 99145567, filed on Dec. 23, 2010. The entirety of each of the above-mentioned patent applications is hereby incorporated by reference herein and made a part of this specification.

BACKGROUND

1. Field of the Disclosure

The disclosure relates to a projection autostereoscopic display. Particularly, the disclosure relates to a projection autostereoscopic display using a stereo screen to display stereo images.

2. Description of Related Art

Three-dimensional (3D) displays will become a trend of a next generation of the display industry. The 3D display is the so-called stereoscopic display. A mechanism of displaying a stereo image is achieved based on characteristics of two eyes. When the two eyes respectively observe images having a parallax, the images respectively entering the two eyes are merged by human brain, and an observer perceives a stereo image. In earlier years, observer has to wear a pair of glasses to view 3D images to ensure the two eyes respectively observe images with the parallax from 3D display. Along with quick development of technology, digital televisions or digital displays are widespread, and the 3D displays of a new generation are also developed. Today, the 3D images can be perceived by naked eyes without wearing the glasses. The naked-eye 3D display generates two or more than two viewing-zones in front of a display screen. A parallax exists between an image of one viewing-zone and an image of another viewing-zone. When the two eyes located in different viewing-zones, the two eyes respectively observe two images with a parallax, and an image with a depth effect is generated in the observer's brain.

In a 3D display system, a screen size is an important factor influencing a depth perception effect, and a larger screen may provide a better depth perception effect. Regarding projection displays, a front projection display is widely used in 3D theatres, it may generate images larger than that of a general flat panel display, though the audience have to wear glasses to view a 3D movie. Therefore, front projection autostereoscopic displays are still under continuously developing.

SUMMARY OF THE DISCLOSURE

The disclosure is directed to a projection autostereoscopic display using a stereo screen to display stereo images. Based on a parallax barrier effect, the stereo images can be observed by naked eyes.

The disclosure is directed to a projection autostereoscopic display using a stereo screen to display stereo images, which can be switched between a two-dimensional (2D) display mode and a three-dimensional (3D) display mode to achieve a wider application range.

An exemplary embodiment of the disclosure provides a projection autostereoscopic display including a projector and a stereo screen. The projector projects an image. The image includes a plurality of viewing-zone images. The stereo screen receives the image and reflects the image back to an observing direction. The stereo screen has an optical stacking layers, and counted from a side closed to the projector, the stereo screen includes a linear polarizer layer, a first microretarder layer, a second microretarder layer and a reflection-type polarization-reserved diffuser layer. The linear polarizer layer receives and polarizes the image. The first microretarder layer is disposed behind the linear polarizer layer, and has a plurality of first microretarder column-shaped regions and second microretarder column-shaped regions, where the first microretarder column-shaped regions and the second microretarder column-shaped regions are arranged in interlace. The second microretarder layer is disposed behind the first microretarder layer by a distance, and has a plurality of third microretarder column-shaped regions and fourth microretarder column-shaped regions, where the third microretarder column-shaped regions and the fourth microretarder column-shaped regions are arranged in interlace. The reflection-type polarization-reserved diffuser layer is disposed behind the second microretarder layer for reflecting and diffusing the image into various directions while maintaining a polarization state of the image.

An exemplary embodiment of the disclosure provides a stereo screen for receiving an image and reflecting the image back to an observing direction. The stereo screen has an optical stacking layers including a linear polarizer layer, a first microretarder layer, a second microretarder layer and a reflection-type polarization-reserved diffuser layer. The linear polarizer layer receives and polarizes an image. The first microretarder layer is disposed behind the linear polarizer layer, and has a plurality of first microretarder column-shaped regions and second microretarder column-shaped regions, where the first microretarder column-shaped regions and the second microretarder column-shaped regions are arranged in interlace. The second microretarder layer is disposed behind the first microretarder layer by a distance, and has a plurality of third microretarder column-shaped regions and fourth microretarder column-shaped regions, where the third microretarder column-shaped regions and the fourth microretarder column-shaped regions are arranged in interlace. The reflection-type polarization-reserved diffuser layer is disposed behind the second microretarder layer for reflecting and diffusing the image into various directions while maintaining a polarization state of the image.

An exemplary embodiment of the disclosure provides a projection autostereoscopic display including a linear polarizer layer, a projector and a stereo screen. The linear polarizer layer is located between the projector and an observing position. The projector projects an image having a linear polarization state. The image includes a plurality of viewing-zone images. The stereo screen receives the image and reflects the image to the linear polarizer layer. The stereo screen has an optical stacking layer, and counted from a side closed to the projector, the optical stacking layer includes a first microretarder layer, a second microretarder layer and a reflection-type polarization-reserved diffuser layer. The first microretarder layer receives the image having the linear polarization state, and has a plurality of first microretarder column-shaped regions and second microretarder column-shaped regions, where the first microretarder column-shaped regions and the second microretarder column-shaped regions are arranged in interlace. The second microretarder layer is disposed behind the first microretarder layer by a distance, and has a plurality of third microretarder column-shaped regions and fourth microretarder column-shaped regions, where the third microretarder column-shaped regions and the fourth microretarder column-shaped regions are arranged in interlace. The reflection-type polarization-reserved diffuser layer is disposed behind the second microretarder layer for reflecting and diffusing the image into various directions while maintaining the polarization state of the image.

In order to make the aforementioned and other features with advantages of the disclosure more comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure provides a projection autostereoscopic display. In case of naked eyes, the projection autostereoscopic display can display stereo images. Based on a characteristic of the projection display, a large display screen with a stereo display effect can be implemented. Moreover, multiple viewing-zone images can be generated. An observer may have more space for moving to observe the stereo images. The projector projects images from a front side of the screen, and a space at the backside of the screen is saved.

However, the projection autostereoscopic display can be switched between a three-dimensional (3D) display mode and a two-dimensional (2D) display mode in response to a user's selection of a 3D display or a 2D display.

A plurality of exemplary embodiments is provided below to describe the disclosure, though the disclosure is not limited to the provided embodiments. Moreover, these exemplary embodiments can be suitably combined with other embodiments, which is not limited to a single embodiment.

Figure 1:
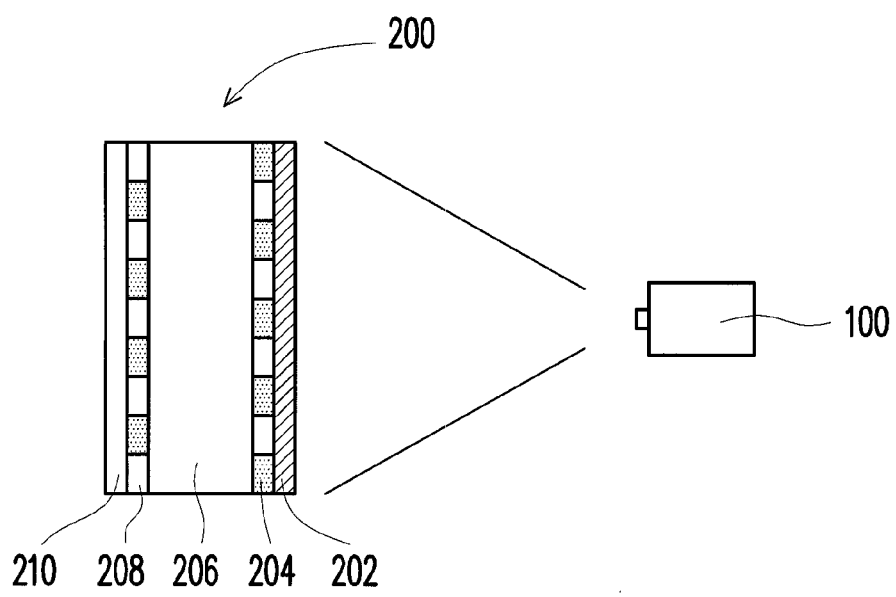
FIG. 1 is a schematic diagram of a projection autostereoscopic display according to an exemplary embodiment of the disclosure.

FIG. 1 is a schematic diagram of a projection autostereoscopic display according to an exemplary embodiment of the disclosure. Referring to FIG. 1, in the projection autostereoscopic display, one projector 100 is taken as an example for description. However, a plurality of projectors can also be used to project a plurality of images to form a larger stereo image, which is described in detail later. The projector 100 projects an image (not shown) onto a stereo screen 200. The image includes a plurality of viewing-zone images. A parallax exists between each of the viewing-zone images and another viewing-zone image. In this way, when the two eyes respectively observe two different viewing-zone images, an image with a stereo effect is generated in the observer's brain.

The stereo screen 200 is designed to have a parallax barrier function. The image (not shown) is projected to the front side of the stereo screen 200, and the observer can observe a stereo image from the same side without wearing any glasses. The stereo screen 200 is an optical stacking layer including a linear polarizer layer 202, a first microretarder layer 204, a second microretarder layer 208 and a reflection-type polarization-reserved diffuser layer 210. For example, the linear polarizer layer 202 and the first microretarder layer 204 are directly adhered to each other. Similarly, the second microretarder layer 208 and the reflection-type polarization-reserved diffuser layer 210 are directly adhered to each other. The first microretarder layer 204 and the second microretarder layer 208 are spaced for a certain distance by a spacer layer 206. Such distance ensures that the image light reflected by the reflection-type polarization-reserved diffuser layer 210 and passing through different microretarder column-shaped regions in the second microretarder layer 208 passes through different microretarder column-shaped regions in the first microretarder layer 204. The observer can only observe the corresponding viewing-zone images at different positions. A thickness of the spacer layer 206 is an adjustable design parameter. The spacer layer 206 can be a transparent material layer or only an interval spaced by a transparent spacer. The spacer layer 206 is not limited to a specific structure or material.

Generally, the linear polarizer layer 202 receives an image (not shown) and transforms a polarization state of the image passing there through to a linear polarization state. The first microretarder layer 204 is adhered behind the linear polarizer layer 202. The second microretarder layer 208 is disposed behind the first microretarder layer 204. The first microretarder layer 204 and the second microretarder layer 208 are spaced for a certain distance by a spacer layer 206. The reflection-type polarization-reserved diffuser layer 210 is disposed behind the second microretarder layer 208 for reflecting and diffusing the incident light into various directions while maintaining the polarization state of the incident light.

Figure 2:
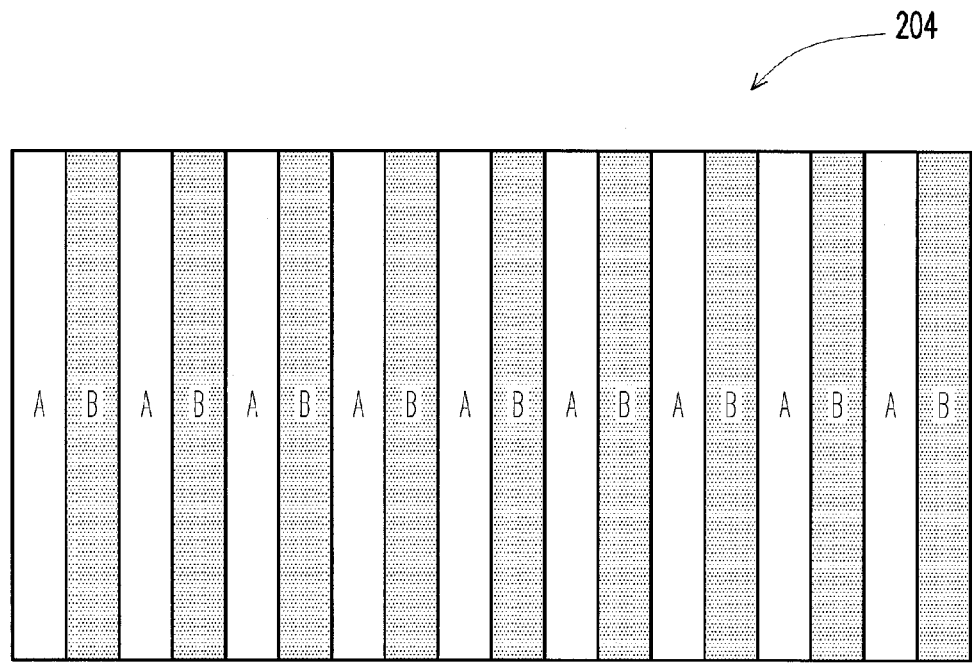
FIG. 2 is a structural schematic diagram of a first microretarder layer according to an exemplary embodiment of the disclosure.

FIG. 2 is a structural schematic diagram of a first microretarder layer according to an exemplary embodiment of the disclosure. Referring to FIG. 2, viewing from the front side, the first microretarder layer 204 has a plurality of first microretarder column-shaped regions B and a plurality of second microretarder column-shaped regions A, where the first microretarder column-shaped regions B are shadowed regions, and the second microretarder column-shaped regions A are blank regions. The first microretarder column-shaped regions B and the second microretarder column-shaped regions A are arranged in interlace. For example, the second microretarder column-shaped region A has a one-half wavelength retardation effect, and an optical axis thereof and an optical axis of the linear polarizer layer 202 form an angle of ±45°. The first microretarder column-shaped region B does not have the phase retardation effect, or has a zero phase retardation effect. The first microretarder column-shaped regions B and the second microretarder column-shaped regions A are extended along a vertical direction of the stereo screen 200, as that shown in FIG. 1 and FIG. 2. Moreover, other examples thereof are described later.

Figure 3:
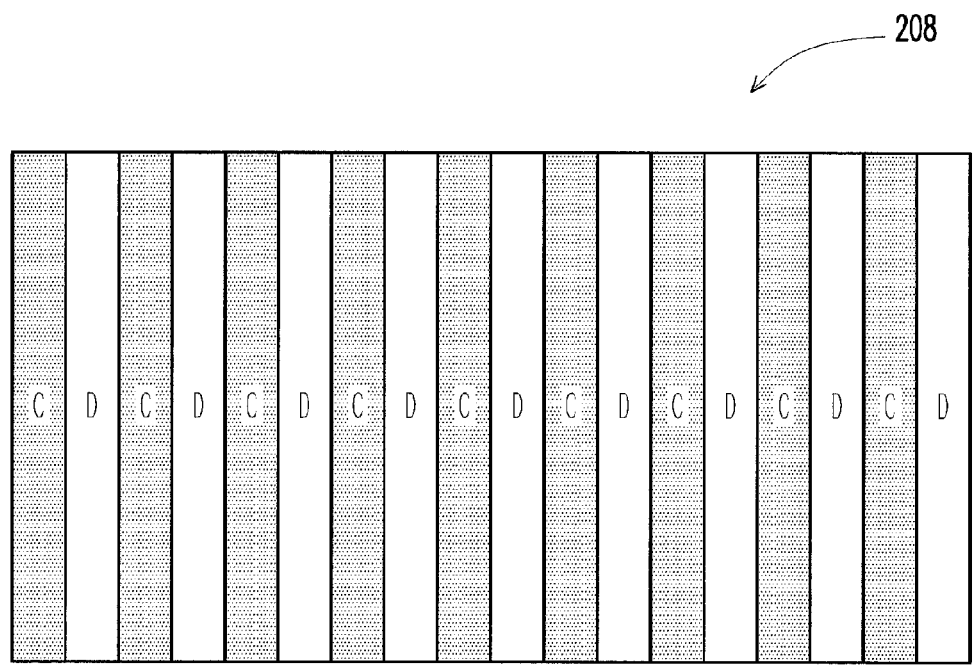
FIG. 3 is a structural schematic diagram of a second microretarder layer according to an exemplary embodiment of the disclosure.

FIG. 3 is a structural schematic diagram of the second microretarder layer according to an exemplary embodiment of the disclosure. Referring to FIG. 3, the second microretarder layer 208 has a plurality of third microretarder column-shaped regions C and a plurality of fourth microretarder column-shaped regions D, where the third microretarder column-shaped regions C are shadowed regions, and the fourth microretarder column-shaped regions D are blank regions. The third microretarder column-shaped regions C and the fourth microretarder column-shaped regions D are arranged in interlace. The third microretarder column-shaped regions C and the fourth microretarder column-shaped regions D are extended along a vertical direction of the stereo screen 200, as that shown in FIG. 1 and FIG. 3. For example, the third microretarder column-shaped region C does not have the phase retardation effect, and the fourth microretarder column-shaped region D has a one-fourth wavelength retardation effect, and an optical axis thereof and the optical axis of the linear polarizer layer 202 form an angle of ±45°. Moreover, other examples thereof are described later. It should be noticed that the microretarder column-shaped regions C and D of the second microretarder layer 208 are located right behind the microretarder column-shaped regions A and B of the first microretarder layer 204, and the light projected from the projector 100 and passing through the region A may pass through the region C, and the light passing through the region B may pass through the region D.

Figure 4:
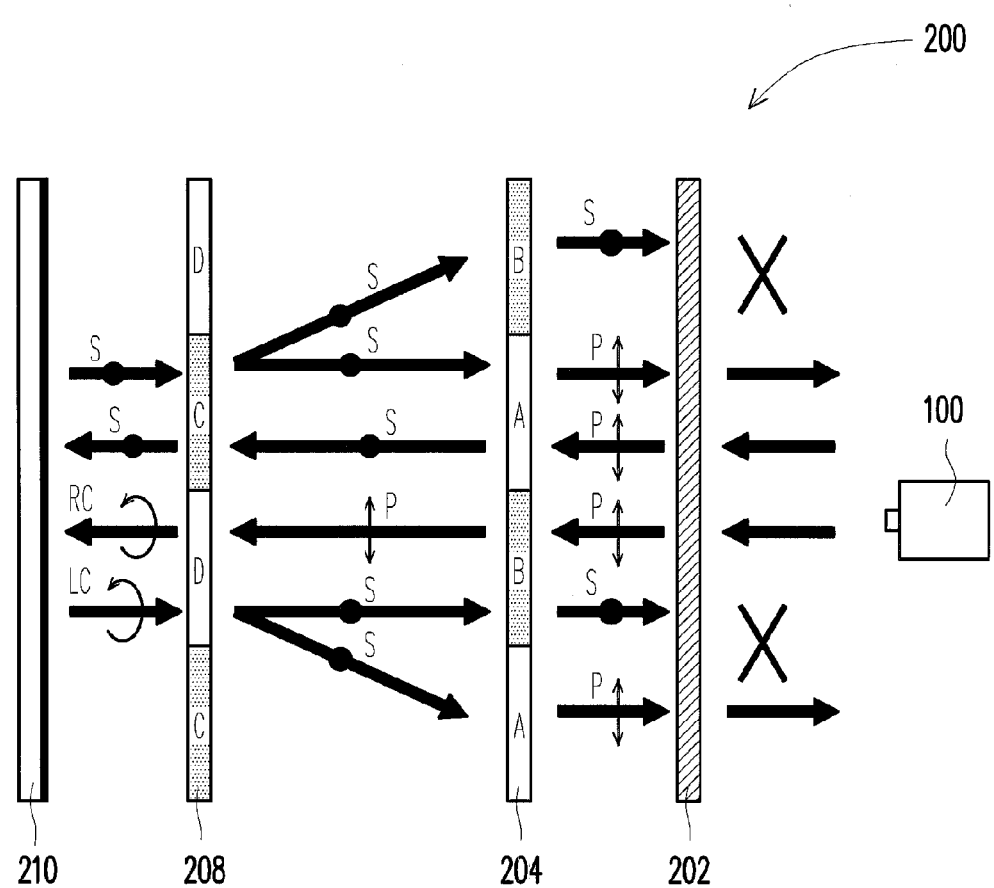
FIG. 4 and FIG. 5 are schematic diagrams illustrating barrier function mechanisms of a 3D display parallax barrier of a projection autostereoscopic display according to an exemplary embodiment of the disclosure.

FIG. 4 is a schematic diagram illustrating a barrier function mechanism of a 3D display parallax barrier of the projection autostereoscopic display according to an exemplary embodiment of the disclosure. Referring to FIG. 4, the projector 100 projects an image light (not shown) onto the linear polarizer layer 202 of the stereo screen 200, and in the present exemplary embodiment, the linear polarizer layer 202 is a P-polarized linear polarizer plate, and the linear polarizer layer 202 and the first microretarder layer 204 are directly adhered to each other. After the image light (not shown) passes through the linear polarizer layer 202, the polarization state thereof is transformed to the P-polarization state, and the polarized light with the P-polarization state directly enters the second microretarder column-shaped regions A and the first microretarder column-shaped regions B of the first microretarder layer 204. Here, only a part of light is illustrated to describe such mechanism. However, the other part of light have the same behavior.

After a part of the polarized light with the P-polarization state enters the second microretarder column-shaped regions A with the one-half wavelength retardation effect in the first microretarder layer 204, this part of the light is changed to the polarized light with an S-polarization state. The polarized light with the S-polarization state enters the third microretarder column-shaped regions C without the retardation effect in the second microretarder layer 208. The third microretarder column-shaped regions C without the retardation effect do not change the polarization state of the light passing there through. Therefore, the polarized light with the S-polarization state enters the reflection-type polarization-reserved diffuser layer 210, where the reflection-type polarization-reserved diffuser layer 210 has a diffusion effect and reflects the incident light to a certain viewing angle range. After the polarized light with the S-polarization state is reflected by the reflection-type polarization-reserved diffuser layer 210, the polarization state thereof is still preserved. The reflected polarized light with the S-polarization state directly enters the third microretarder column-shaped regions C without the retardation effect in the second microretarder layer 208, and the S-polarization state thereof is still preserved. Due to the diffusion effect, the reflected polarized light with the S-polarization state may enter the second microretarder column-shaped regions A with the one-half wavelength retardation effect or the first microretarder column-shaped regions B without the retardation effect in the first microretarder layer 204. When the polarized light with the S-polarization state enters the second microretarder column-shaped regions A with the one-half wavelength retardation effect in the first microretarder layer 204, the polarized light with the S-polarization state is transformed to a polarized light with the P-polarization state. When the polarized light with the S-polarization state enters the first microretarder column-shaped regions B without the retardation effect in the first microretarder layer 204, the S-polarization state of the polarized light is still maintained. In this example, since the linear polarizer layer 202 has the P-polarization state, the polarized light with the S-polarization state that enters the linear polarizer layer 202 is blocked and cannot pass through the linear polarizer layer 202 with the P-polarization state, though the polarized light with the P-polarization state that enters the linear polarizer layer 202 can pass through the linear polarizer layer 202 with the P-polarization state. Such barrier characteristic is the so-called parallax barrier function.

After another part of the polarized light with the P-polarization state passes through the linear polarizer layer 202 and enters the first microretarder column-shaped regions B without the retardation effect in the first microretarder layer 204, the P-polarization state thereof is still maintained, and then the polarized light with the P-polarization state further enters the fourth microretarder column-shaped regions D with the one-fourth wavelength retardation effect in the second microretarder layer 208. Due to the phase retardation effect of the second microretarder layer 208, the polarized light with the P-polarization state is transformed into a right-hand circular polarization state (RC-status). After the light of the RC-status is reflected by the reflection-type polarization-reserved diffuser layer 210, it transformed into a left-hand circular polarization state (LC-status). The reflected light of the LC-status again enters the fourth microretarder column-shaped regions D with the one-fourth wavelength retardation effect in the second microretarder layer 208, and is transformed into the S-polarization state. The light with the S-polarization state enters the second microretarder column-shaped regions A with the one-half wavelength retardation effect or the first microretarder column-shaped regions B without the retardation effect in the first microretarder layer 204. When the light with the S-polarization state enters the second microretarder column-shaped regions A with the one-half wavelength retardation effect in the first microretarder layer 204, the light with the S-polarization state is transformed to the P-polarization state and passes through the linear polarizer layer 202. When the light with the S-polarization state enters the first microretarder column-shaped regions B without the retardation effect in the first microretarder layer 204, the S-polarized light is still maintained, and it is blocked by the linear polarizer layer 202.

In this way, the stereo screen 200 has the parallax barrier function. The stereo screen 200 can directly project a plurality of viewing-zone images for respectively entering the two eyes, to form the stereo image. The stereo screen 200 can receive the image (not shown) projected from the front side of the stereo screen 200. The images (not shown) projected from the projector 100 can all reach the reflection-type polarization-reserved diffuser layer 210 without being blocked, and only the polarization state thereof is changed and a brightness thereof is slightly reduced due to material absorption. In other words, the stereo screen 200 can receive an integral image content without missing some pixel contents of the image. However, regarding the reflected light, the parallax is formed due to a design of the first microretarder layer 204. Besides that the image is projected from the front side of the screen, the effect thereof is similar to a situation of placing a parallax barrier in front of a display plane.

Figure 5:
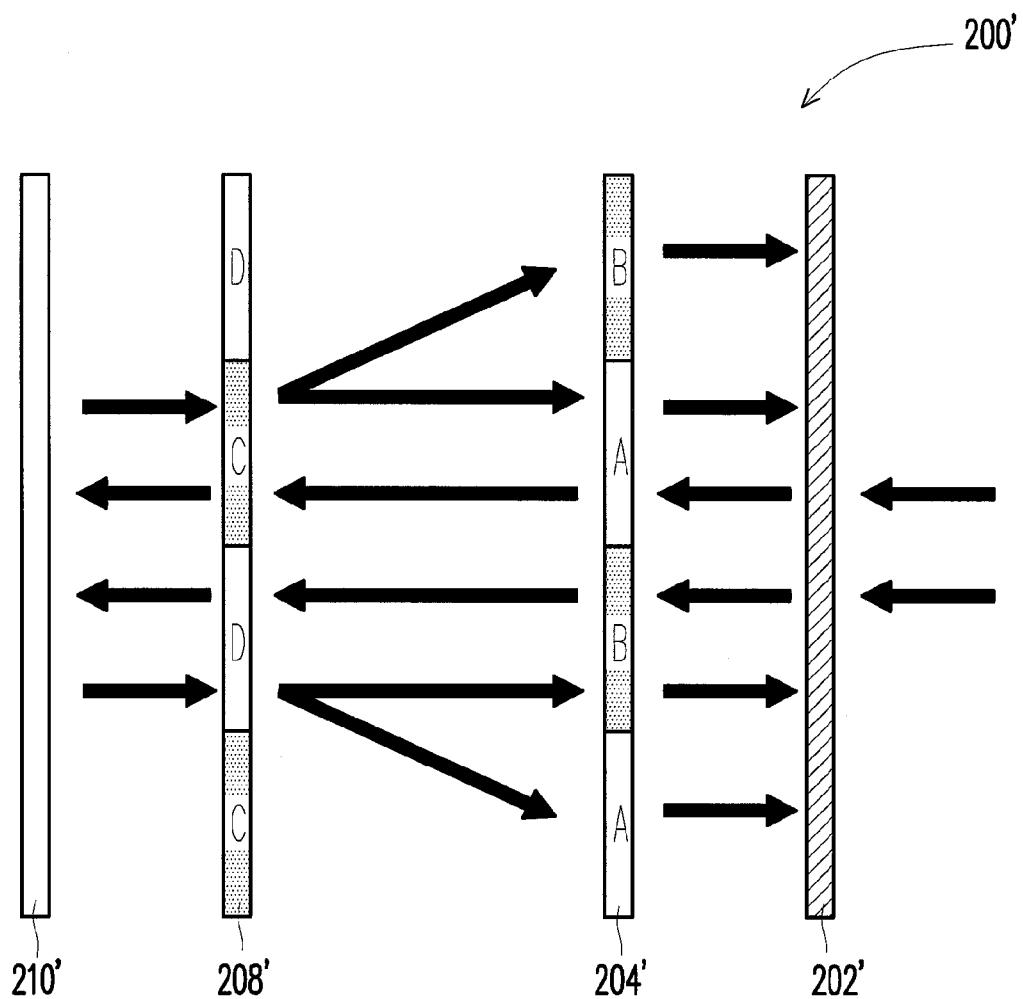

The above example is not the only possible arrangement, in other words, the regions A, B, C and D shown in FIG. 2 and FIG. 3 may have other different phase retardation configurations, though the operation mechanism thereof is the same. Another exemplary embodiment is provided with reference of FIG. 5. FIG. 5 is a schematic diagram illustrating a barrier function mechanism of a 3D display parallax barrier of the projection autostereoscopic display according to another exemplary embodiment of the disclosure. Referring to FIG. 5, a first microretarder layer 204' of the stereo screen 200' is also divided into the regions A and B, and a second microretarder layer 208' of the stereo screen 200' is also divided into the regions C and D. When the light enters a linear polarizer layer 202' and is reflected by a reflection-type polarization-reserved diffuser layer 210', there are four optical paths:

Optical path 1: P-polarization state→A→C→C→A;
Optical path 2: P-polarization state→A→C→C→B;
Optical path 3: P-polarization state→B→D→D→B; and
Optical path 4: P-polarization state→B→D→D→A.

In order to achieve the parallax barrier effect based on the first microretarder layer 204' and the second microretarder layer 208', the light passing through the optical path 1 or 4 has to be the P-polarization state, and the light passing through the optical path 2 or 3 has to be the S-polarization state. To satisfy the above conditions, phase retardation values of the regions A, B, C and D have to satisfy the following conditions:

$$A+C=\pm m\pi, m=0, 1, 2, 3, \ldots;$$ 1.

$$B+D=\pm(n+\tfrac{1}{2})\pi, n=0, 1, 2, \ldots; \text{ and}$$ 2.

$$A-B=\pm(2k+1)\pi, k=0, 1, 2, 3, \ldots.$$ 3.

More examples for the parallax barrier effect of the stereo display are as that shown in a following table 1. However, the table 1 only lists a few more examples, which are not all of the cases.

TABLE 1

| A | B | C | D | Optical path | Final polarization state |
|---|---|---|---|---|---|
| π | 0 | 0 | π/2 | #1 P→A→C→C→A | P |
|   |   |   |   | #2 P→A→C→C→B | S |
|   |   |   |   | #3 P→B→D→D→B | S |
|   |   |   |   | #4 P→B→D→D→A | P |
| π | 0 | π | π/2 | #1 P→A→C→C→A | P |
|   |   |   |   | #2 P→A→C→C→B | S |
|   |   |   |   | #3 P→B→D→D→B | S |
|   |   |   |   | #4 P→B→D→D→A | P |
| π/2 | −π/2 | π/2 | 0 | #1 P→A→C→C→A | P |
|   |   |   |   | #2 P→A→C→C→B | S |
|   |   |   |   | #3 P→B→D→D→B | S |
|   |   |   |   | #4 P→B→D→D→A | P |

Moreover, the parallax barrier effect can also be achieved when the light passing through the optical path 1 or 4 has the S-polarization state, and the light passing through the optical path 2 or 3 has the P-polarization state. To satisfy the above conditions, the phase retardation values of the regions A, B, C and D have to satisfy the following conditions:

$$B+D=\pm m\pi, m=0, 1, 2, 3, \ldots;$$ 1.

$$A+C=\pm(n+\tfrac{1}{2})\pi, n=0, 1, 2, \ldots; \text{ and}$$ 2.

$$A-B=\pm(2k+1)\pi, k=0, 1, 2, 3, \ldots.$$ 3.

Which are the other possible phase retardation values of the regions A, B, C and D capable of achieving the parallax barrier effect.

In the examples of the table 1, the light passing through the optical path 1 or 4 has the P-polarization state, and the light can pass through the linear polarizer layer 202' with the P-polarization state. Meanwhile, the light passing through the optical path 2 or 3 has the S-polarization state, and the light is blocked by the linear polarizer layer 202' with the P-polarization state. Based on the same principle, the linear polarizer layer 202' can also be a linear polarizer with the S-polarization state.

Figure 6:
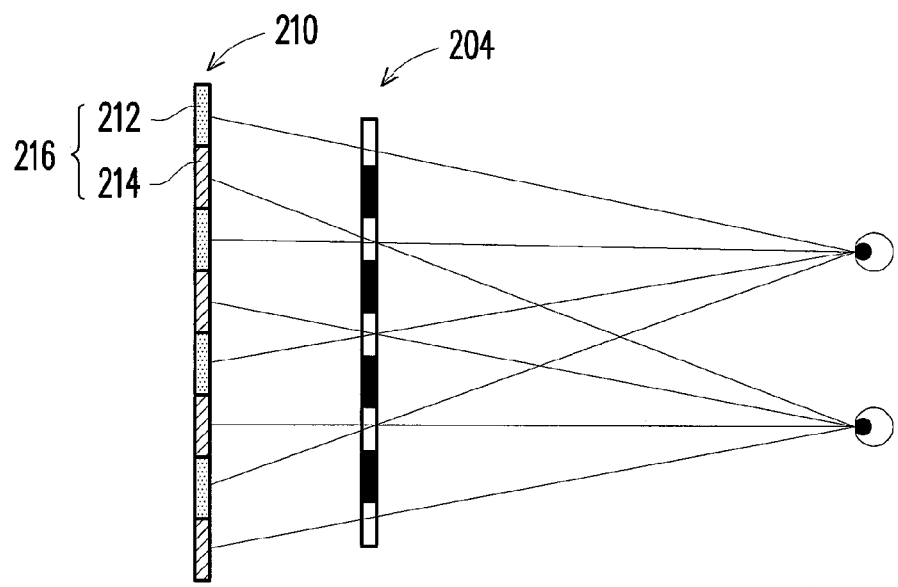
FIG. 6 is a schematic diagram illustrating a projection autostereoscopic display achieving a stereo display effect through two viewing-zones according to an exemplary embodiment of the disclosure.

In an actual application, embodiments of two viewing-zones and four viewing-zones are provided for description. FIG. 6 is a schematic diagram illustrating a projection autostereoscopic display achieving a stereo display effect through two viewing-zones according to an exemplary embodiment of the disclosure. Referring to FIG. 6, in the present exemplary embodiment, the number of the viewing-zones is two, and the image (not shown) projected to the reflection-type polarization-reserved diffuser layer 210 includes two viewing-zone images. In other words, each pixel 216 has two sub-pixels 212 and 214 respectively belonged to the two viewing-zone images, and the two viewing-zone images are respectively observed by two eyes. As shown in FIG. 4, the parallax barrier function is formed after the reflected image (not shown) passes through the linear polarizer layer 202. Based on the parallax barrier function, one eye can only view the pixel 212 belonged to one of the two viewing-zone images, and another eye can only view the pixel 214 belonged to another one of the two viewing-zone images. Therefore, the stereo effect can be created in the observer's visual system.

Figure 7:
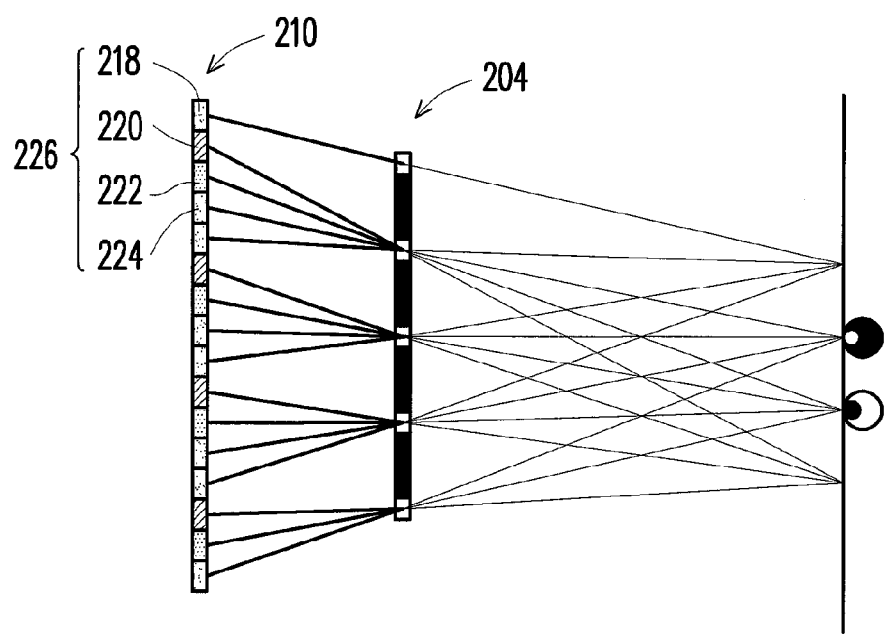
FIG. 7 is a schematic diagram illustrating a projection autostereoscopic display achieving a stereo display effect through four viewing-zones according to an exemplary embodiment of the disclosure.

FIG. 7 is a schematic diagram illustrating a projection autostereoscopic display achieving stereo display through four viewing-zones according to an exemplary embodiment of the disclosure. Referring to FIG. 7, similar to the mechanism of FIG. 6, one pixel 226 includes four sub-pixels 218, 220, 222 and 224 respectively belonged to fourth viewing-zones. Based on the same parallax barrier function, the two eyes can respectively view any two sub-pixels of the four sub-pixels. In this example, the two eyes respectively view the sub-pixels 222 and 224. However, if the observer moves to another position, the two eyes may probably view the other two sub-pixels of the four sub-pixels. Such design allows the observer to view the stereo image from the other positions, and allows more observers to view such stereo image. If the number of the viewing-zone images is increased, a movement degree of freedom of the observer is also increased. However, an image resolution along a horizontal direction is probably reduced.

Figure 8:
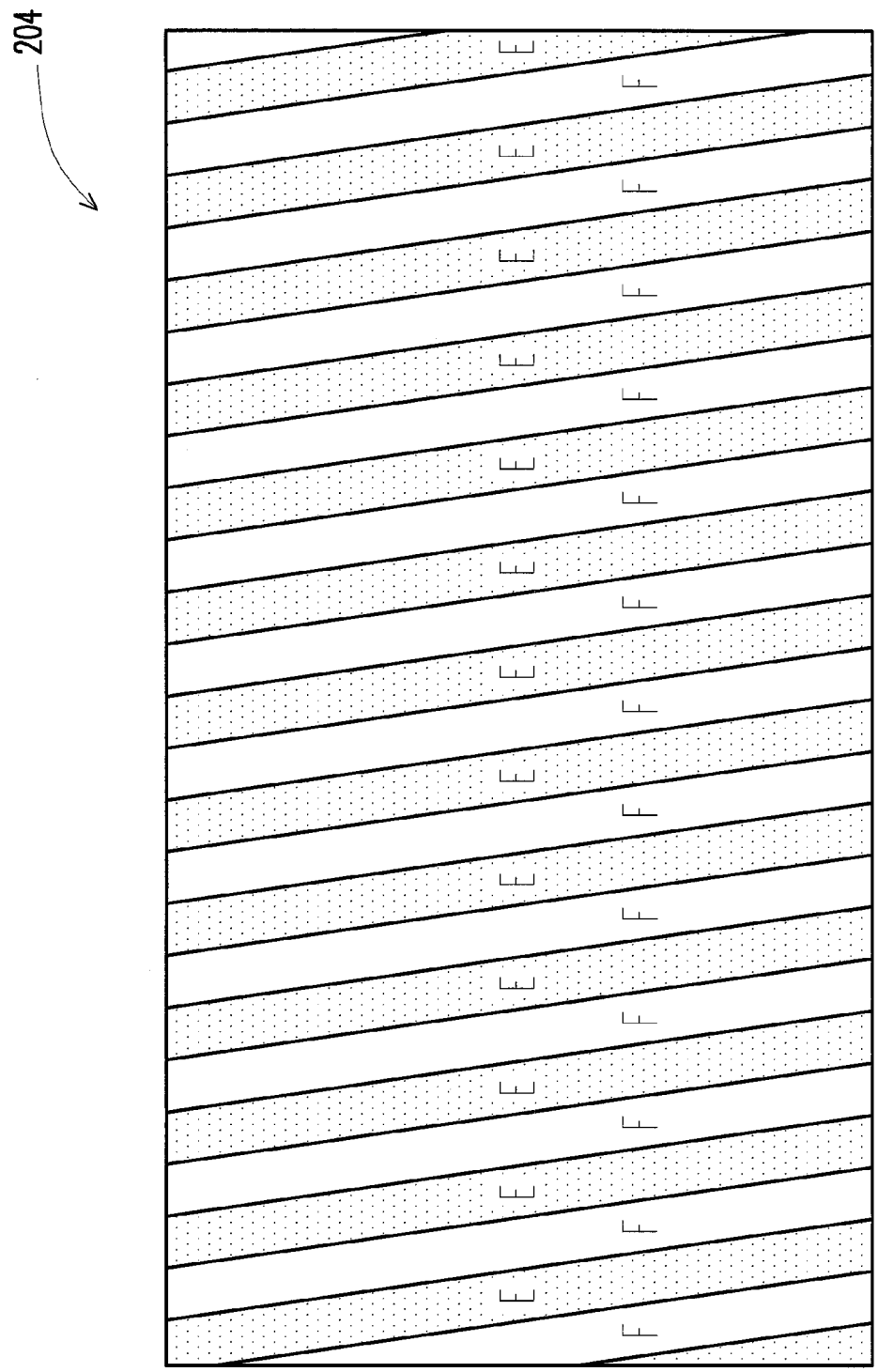
FIG. 8 and FIG. 9 are schematic diagrams illustrating a first and a second microretarder layers with an oblique structure according to an exemplary embodiment of the disclosure.
Figure 9:
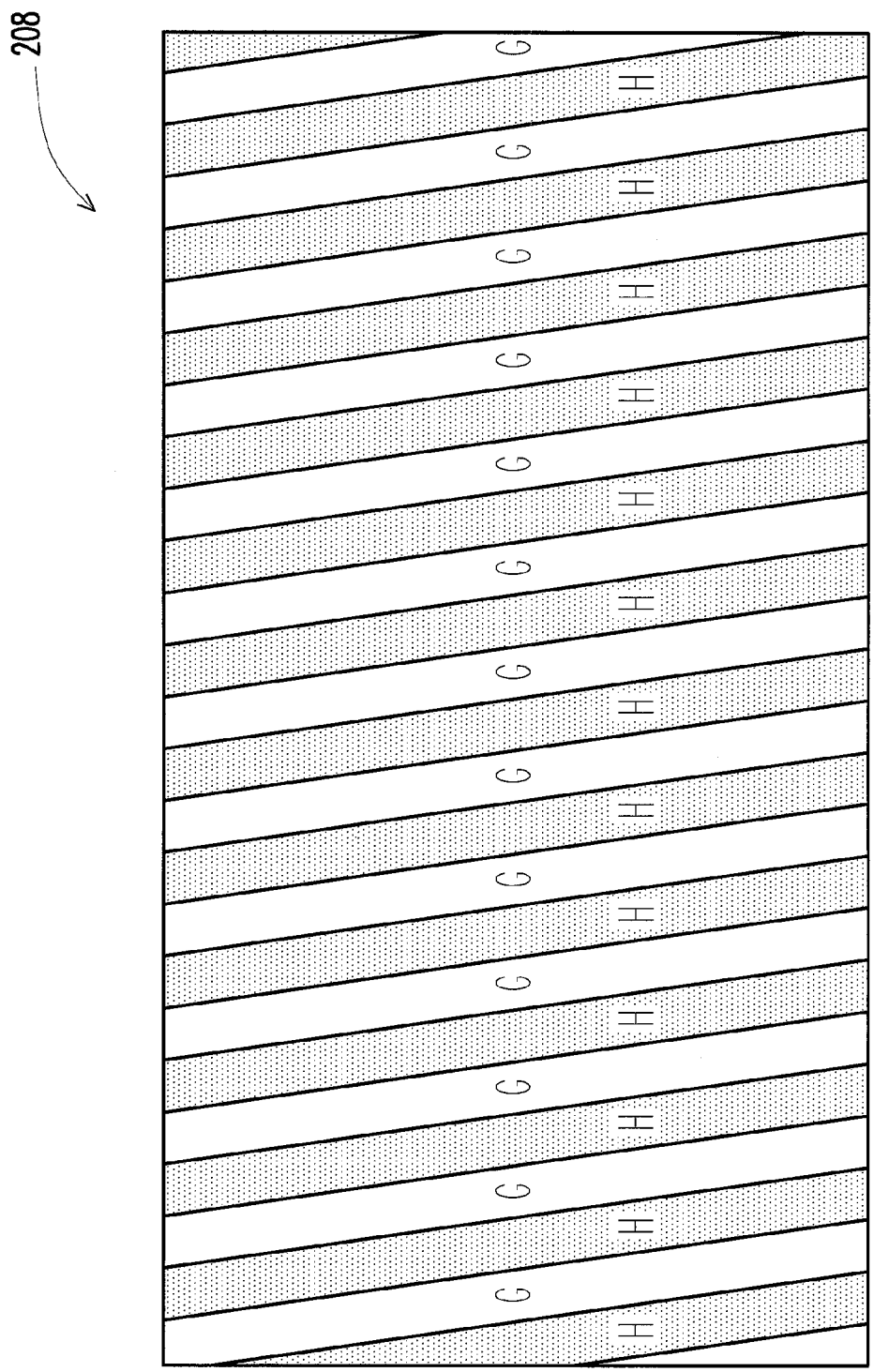

Therefore, when the number of the viewing-zone images is increased, in order to balance a horizontal resolution and a vertical resolution, the first and the second microretarder layers can be designed to have an oblique structure. FIG. 8 and FIG. 9 are schematic diagrams illustrating the first and the second microretarder layers with an oblique structure according to an exemplary embodiment of the disclosure. First microretarder column-shaped regions E with the one-half wavelength retardation effect and second microretarder column-shaped regions F without the retardation effect in the first microretarder layer 204 are arranged in an oblique pattern. Similarly, third microretarder column-shaped regions H with the one-fourth wavelength retardation effect and fourth microretarder column-shaped regions G without the retardation effect in the second microretarder layer 208 are also arranged in an oblique pattern, and the microretarder column-shaped regions E, F, G and H in the first microretarder layer 204 and the second microretarder layer 208 are extended along a direction oblique to the vertical direction of the stereo screen by an angle, and the parallax barrier function thereof is also as that described in the aforementioned embodiment, though the pixel patterns thereof are required to be rearranged. Therefore, widths of the microretarder column-shaped regions of the first microretarder layer 204 and the second microretarder layer 208 are suitably designed according to a projection position of the projector 100 and a pixel shape and size of the image, and in collaboration with a corresponding thickness and a corresponding material refractive index of the spacer layer 206, a part of the image reflected by the stereo screen can only be viewed from a specific viewing angle. In other words, the width of the first microretarder column-shaped region and the width of the second microretarder column-shaped region in the first microretarder layer can be designed proportional to the width of the third microretarder column-shaped region and the width of the fourth microretarder column-shaped region in the second microretarder layer. Therefore, when the image is input, the image pixels corresponding to different viewing angles can be set, and the left and right eyes of the observer can view images of different viewing angles, to perceive the stereo image and achieve the naked-eye stereo display effect.

Figure 10:
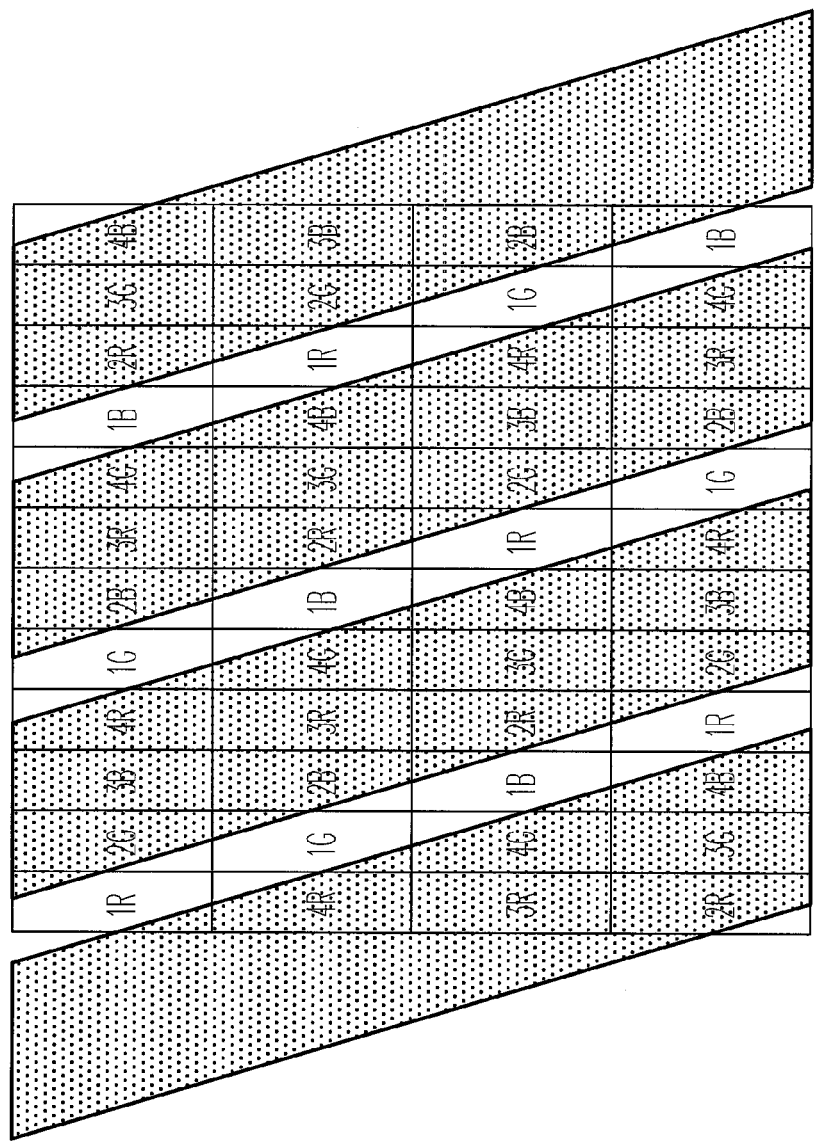
FIG. 10 is a schematic diagram of a configuration between a microretarder layer with an oblique structure and an image pixel pattern according to an exemplary embodiment of the disclosure.

FIG. 10 is a schematic diagram of a configuration between a microretarder layer with an oblique structure and an image pixel pattern according to an exemplary embodiment of the disclosure. In FIG. 10, the oblique parallax barrier is represented by a shadow pattern. In this case, the pixels of the four viewing-zone images are also arranged in oblique. The numbers 1, 2, 3 and 4 represent the four viewing-zone images, and the symbols R, G and B represent sub-pixels of three primary colors of a full color pixel. As shown in FIG. 10, the pixels of the viewing-zones are arranged in an oblique angle the same to that of the parallax barrier other than being vertically arranged.

Figure 11:
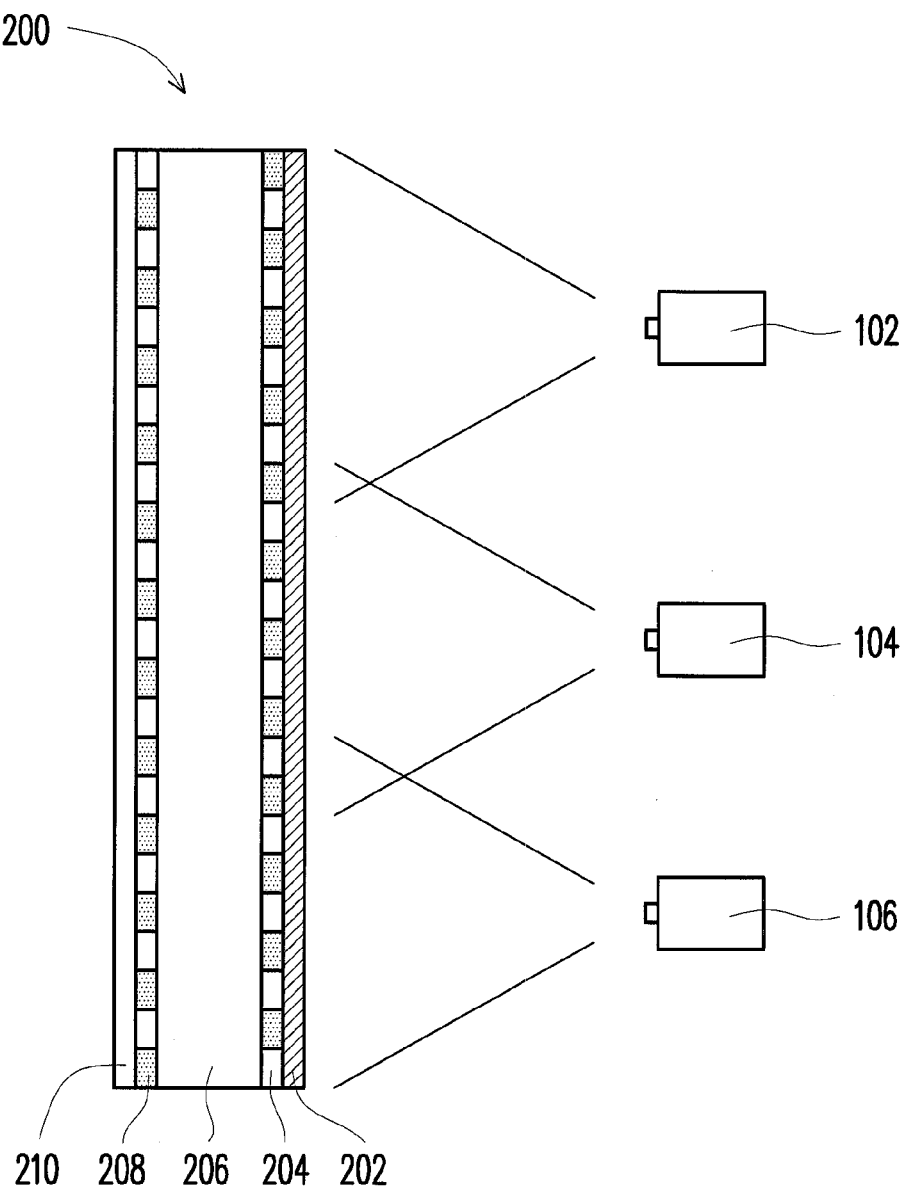
FIG. 11 is a schematic diagram illustrating a projection autostereoscopic display having a plurality of projectors according to an exemplary embodiment of the disclosure.

In order to obtain a relatively large display area, the projector 100 of FIG. 1 can be formed by a plurality of part projectors 102, 104 and 106 as that shown in FIG. 11. The part projectors respectively project a part image of an integral image (not shown). In this way, the integral image can be formed by the part images projected by the part projectors 102, 104 and 106. In this case, the stereo screen 200 can maintain a same display effect without any variation.

Figure 12:
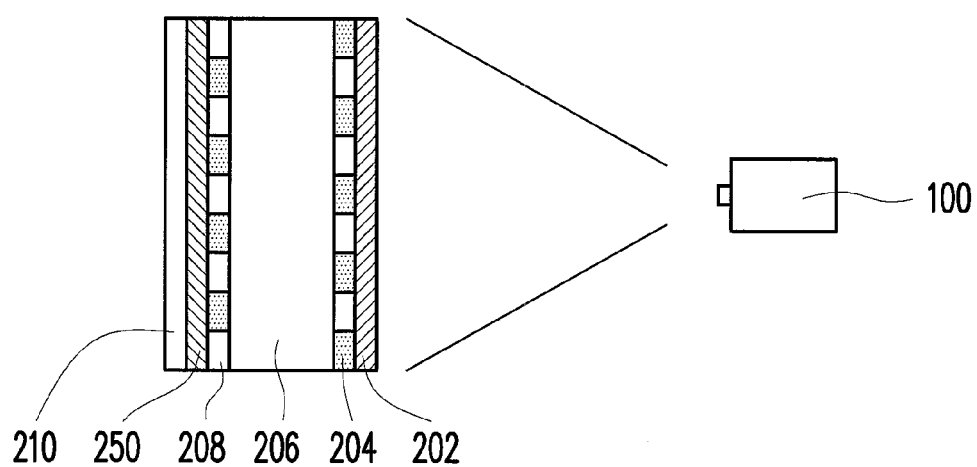
FIG. 12 is schematic diagram of a projection autostereoscopic display having a phase compensation plate according to an exemplary embodiment of the disclosure.

Although the polarization state of the image light is changed in different stages, a phase compensation plate can still be disposed in the stereo screen to enhance a performance thereof. FIG. 12 is schematic diagram of a projection autostereoscopic display having a phase compensation plate according to an exemplary embodiment of the disclosure. In FIG. 12, the phase compensation plate 250 is disposed between the reflection-type polarization-reserved diffuser layer 210 and the second microretarder layer 208. Alternatively, the phase compensation plate 250 can be disposed at any place between the reflection-type polarization-reserved diffuser layer 210 and the first microretarder layer 204. The phase compensation plate 250 is, for example, a reversed retardation plate, which can accurately adjust the polarization state of the light through a certain degree of the retardation function.

Referring to FIG. 5, another possible option is that the linear polarizer layer 202' has the P-polarization state, and one set of the lights passing through the optical paths 1 and 4 or the optical paths 2 and 3 have the S-polarization state, and the lights passing through the other two optical paths have a polarization state other than the P-polarization state or the S-polarization state. Another possible option is that the linear polarizer layer 202' has the S-polarization state, and the lights passing through the optical paths 1 and 4 or the optical paths 2 and 3 have the P-polarization state, and one set of the lights passing through the other two optical paths have a polarization state other than the P-polarization state or the S-polarization state. In the above two cases, brightness of the image is reduced, though the stereo display effects is still achieved. An example complied with the above two cases is that the second microretarder column-shaped regions A of the first microretarder layer 204 have a one-fourth wavelength phase retardation effect, and the first microretarder column-shaped regions B of the first microretarder layer 204 do not have the phase retardation effect, while the third microretarder column-shaped regions C of the second microretarder layer 208 do not have the phase retardation effect, and the fourth microretarder column-shaped regions D of the second microretarder layer 208 have a one-eighth wavelength phase retardation effect.

A method for switching a 3D display mode to a 2D display mode is described below, to achieve wider applications.

Figure 13:
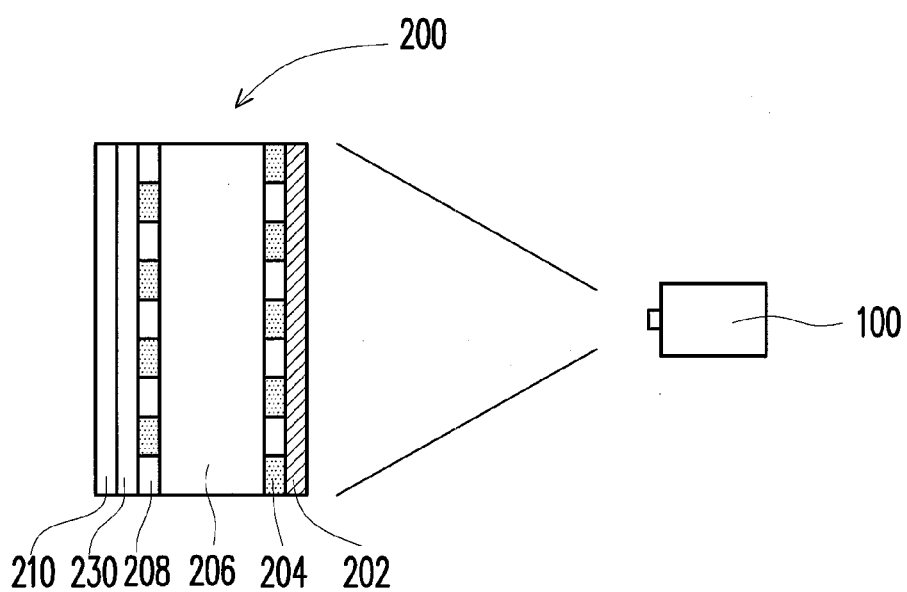
FIG. 13 is a schematic diagram of a projection autostereoscopic display capable of being switched to a 2D display mode or a 3D display mode according to an exemplary embodiment of the disclosure.

FIG. 13 is a schematic diagram of a projection autostereoscopic display capable of being switched to a 2D display mode or a 3D display mode according to an exemplary embodiment of the disclosure. Referring to FIG. 13, the structure of the present exemplary embodiment is similar to that of the embodiment of FIG. 1, and a switching layer 230 is disposed between the second microretarder layer 208 and the reflection-type polarization-reserved diffuser layer 210. A material of the switching layer 230 is, for example, a liquid crystal material, which can be switched between a transparent state and an opaque state through voltage control. Based on the material characteristic of the switching layer 230, the switching layer 230 may also have the transparent state or a polarization variation state through the voltage control. The so-called transparent state refers to that a polarization state of the light passing there through is maintained unchanged, which is equivalent to a transparent phenomenon, and the 3D display effect can be still maintained. When the switching layer 230 is switched to the opaque state or the polarization variation state, since components of the P-polarizations, the S-polarization state or other polarization states simultaneously exist, the parallax barrier effect is spoiled, and the 2D display effect is achieved. The characteristics of the switching layer 230 are as that shown in FIG. 14 and FIG. 15.

Figure 14:
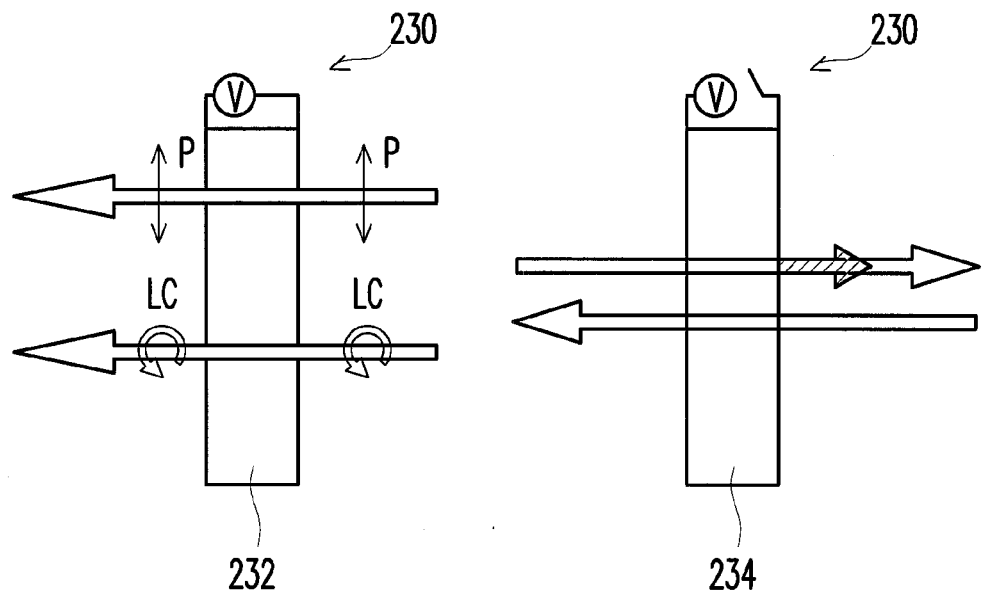
FIG. 14 is a schematic diagram illustrating a functional mechanism of a switching layer according to an exemplary embodiment of the disclosure.

FIG. 14 is a schematic diagram illustrating a functional mechanism of the switching layer according to an exemplary embodiment of the disclosure. Referring to FIG. 14, the switching layer 230 is, for example, a polymer dispersed liquid crystal (PDLC) layer, which can be switched to a transparent state 232 through the voltage control, and the incident light can maintain its polarization state after passes through the switching layer 232 of the transparent state. When the switching layer 230 is switched to an opaque state 234, for example, the switching layer 230 has scattered liquid crystal molecules, most of the incident light passes through the switching layer 230 or is reflected by the switching layer 230, which is determined by a thickness thereof, and the polarization states of the passing-through light and the reflected light are all changed, where the passing-through light is reflected by the rear reflection-type polarization-reserved diffuser layer 210 and again passes through the switching layer 230, and it is changed to non-polarized light. Therefore, regardless of the passing-through light or the reflected light, it is changed to the non-polarized light. Namely, after the incident light having a certain polarization state passes through the switching layer 230 or is reflected by the switching layer 230, it is changed to the non-polarized light. Therefore, the parallax barrier effect is spoiled, and the 2D display effect is achieved.

Figure 15:
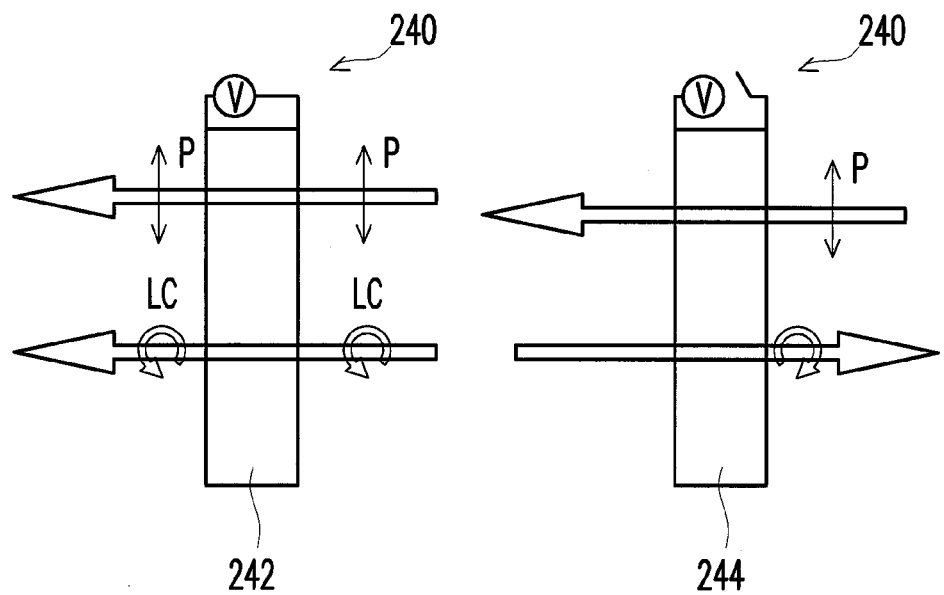
FIG. 15 is a schematic diagram illustrating a functional mechanism of another switching layer according to an exemplary embodiment of the disclosure.

FIG. 15 is a schematic diagram illustrating another functional mechanism of the switching layer according to an exemplary embodiment of the disclosure. Referring to FIG. 15, the switching layer 240 is, for example, a liquid crystal layer, which can be switched between the transparent state 242 and the polarization variation state 244 through the control voltage, and the switching layer 240 can also be a switchable phase retarder material layer. When the switching layer 240 is in the transparent state, it is suitable for the 3D display mode. The so-called transparent state refers to that the polarization state of the light passing there through is maintained unchanged. When the switching layer 240 is switched to the polarization variation state 244, the polarization state of the light is changed. Since the image light passes through the switching layer 240 back and forth, a changing degree of the polarization state of the image light is varied along with an insertion position of the switching layer 240. For example, the switching layer 240 is a twisted nematic liquid crystal (TNLC) layer, and when it is designed as a one-eighth wavelength retarder layer when being powered, the light with a linear polarization state incident thereto is changed to a circular polarization state after the light emits out there from. Now, since the circular polarization state includes the P-polarization state and the S-polarization state, the parallax barrier effect is disappeared, to achieve the 2D display mode.

Figure 16:
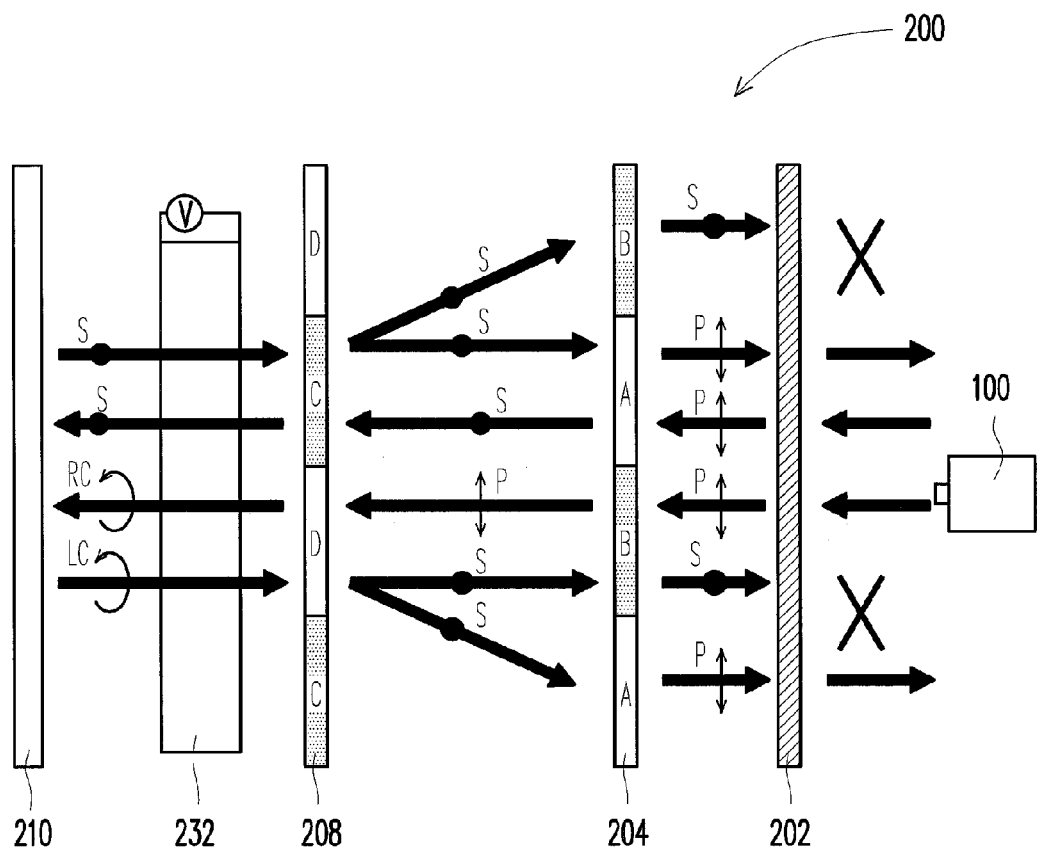
FIG. 16 is a schematic diagram illustrating a barrier function mechanism of a 3D display parallax barrier of a projection autostereoscopic display according to an exemplary embodiment of the disclosure.

FIG. 16 is a schematic diagram illustrating a barrier function mechanism of a 3D display parallax barrier of a projection autostereoscopic display according to an exemplary embodiment of the disclosure. Referring to FIG. 16, the switching layer 230 is, for example, the switching layer of FIG. 14, and is disposed between the second microretarder layer 208 and the reflection-type polarization-reserved diffuser layer 210. When the 3D display mode is switched, the switching layer 230 is switched to the transparent state 232, which does not change the polarization state of the light. Therefore, the 3D display mechanism thereof is as that described in the embodiment of FIG. 4, which is not repeated herein.

Figure 17:
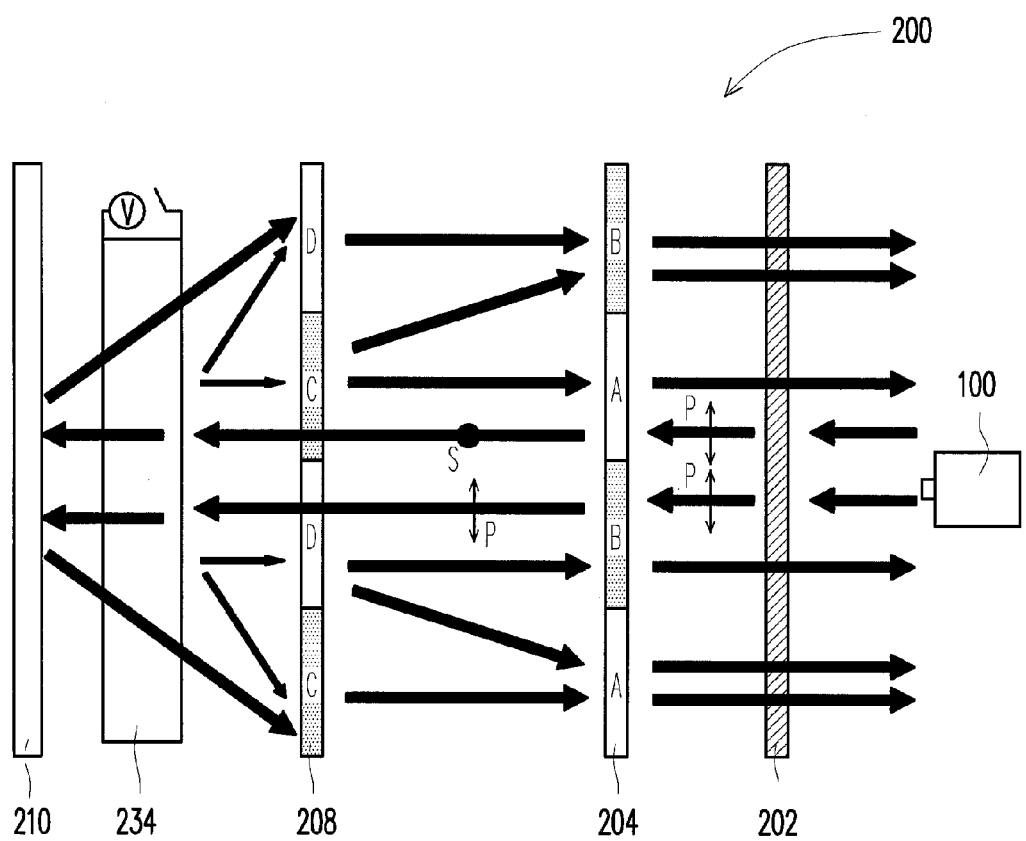
FIG. 17 is a schematic diagram illustrating a display mechanism of a projection autostereoscopic display switched from a 3D display mode to a 2D display mode according to an exemplary embodiment of the disclosure.

FIG. 17 is a schematic diagram illustrating a display mechanism of a projection autostereoscopic display switched from the 3D display mode to the 2D display mode according to an exemplary embodiment of the disclosure. Referring to FIG. 17, a structure of the stereo screen 200 is similar to that of the stereo screen 200 of FIG. 16, though the switching layer 230 is switched to the opaque state 234. Therefore, most of the incident light passes through the switching layer 230 or are reflected by the switching layer 230. Taking the PDLC material as an example, it may have a part of passing-through light and a part of reflected light, and the polarization state of the light is changed to the non-polarized state. If the thickness of the switching layer 230 is relatively small, most of the light may pass through the switching layer 230. However, the passing-through light would be reflected by the reflection-type polarization-reserved diffuser layer 210 at back of the switching layer 230 and again passes through the switching layer 230, and it is still in the non-polarized state. Therefore, the reflected light still maintains its non-polarized state after passes through the microretarder column-shaped regions A-D of the second microretarder layer 208 and the first microretarder layer 204, and totally passes through the linear polarizer layer 202 without generating the parallax barrier effect. The 2D display effect can be achieved.

If the switching layer 230 is taking from the switching layer 240 of FIG. 15, which is a retarder layer with λ/8 retardation as an example, the linear polarized light incident thereto is changed to the circular polarization state after two times of changes for the polarization states, where the circular polarization state includes the P-polarization state and the S-polarization state, and the light still maintains its circular polarization state after passes through the two microretarder layers 204 and 208. The parallax barrier effect would disappear, and the 2D display effect is achieved.

The switching layer changes the polarization state of the incident light through a switching operation, and a material thereof is, for example, the liquid crystal layer. In the 3D display mode, the liquid crystal of the switching layer 240 is controlled to be an isotropic film by an electric field. In this case, the incident light maintains its polarization state after passing there through. The first microretarder layer 204 maintains the parallax barrier function and generates the stereo image effect. If the switching layer 240 is switched to the 2D display mode, the switching layer 240 changes the polarization state of the light passing there through, and the first microretarder layer 204 loses the parallax barrier function, resulting in 2D display effect. The switching layer 240 can be disposed at any place between the linear polarizer layer 202 and the reflection-type polarization-reserved diffuser layer 210.

The switching layer 230 is used to switch the 2D/3D display mode. In the 3D display mode, the switching layer 230 is switched to the transparent state 232 for the light passing through. In the 2D display mode, the switching layer 230 is switched to the opaque state 234, and most of the incident light is reflected to form an image plane. Therefore, the switching layer 230 can be disposed at other positions besides that shown in the stereo screen 200 of FIG. 13.

Figure 18:
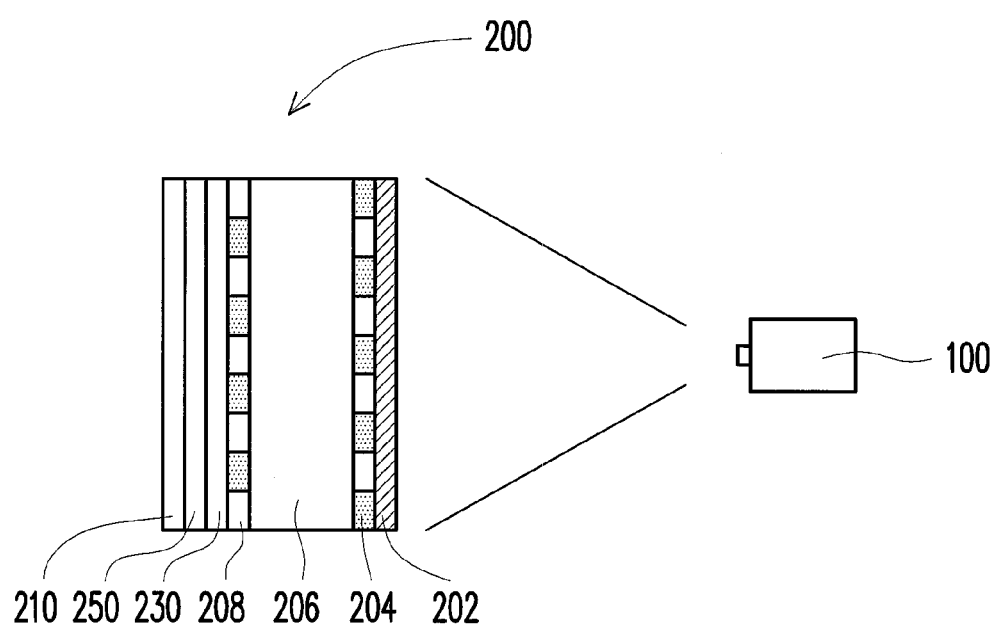
FIG. 18 is a structural schematic diagram of a stereo screen according to an exemplary embodiment of the disclosure.

FIG. 18 is a structural schematic diagram of a stereo screen according to an exemplary embodiment of the disclosure. Referring to FIG. 18, since after the projection light enters the stereo screen 200 with the special structure, it has a plurality of variations in polarization state, in order to achieve a desired polarization state of the projection light, a phase compensation plate 250 can be added at any place between the reflection-type polarization-reserved diffuser layer 210 and the first microretarder layer 204, to precisely modify the polarization state.

Figure 19:
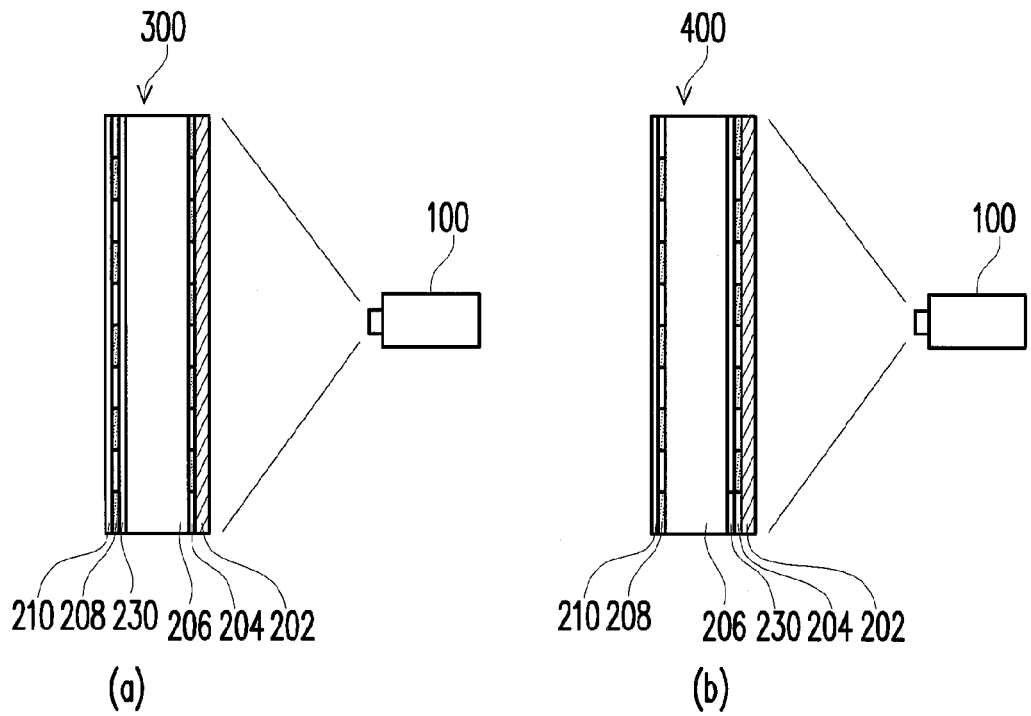
FIG. 19 is a structural schematic diagram of a stereo screen according to an exemplary embodiment of the disclosure.
Figure 19:
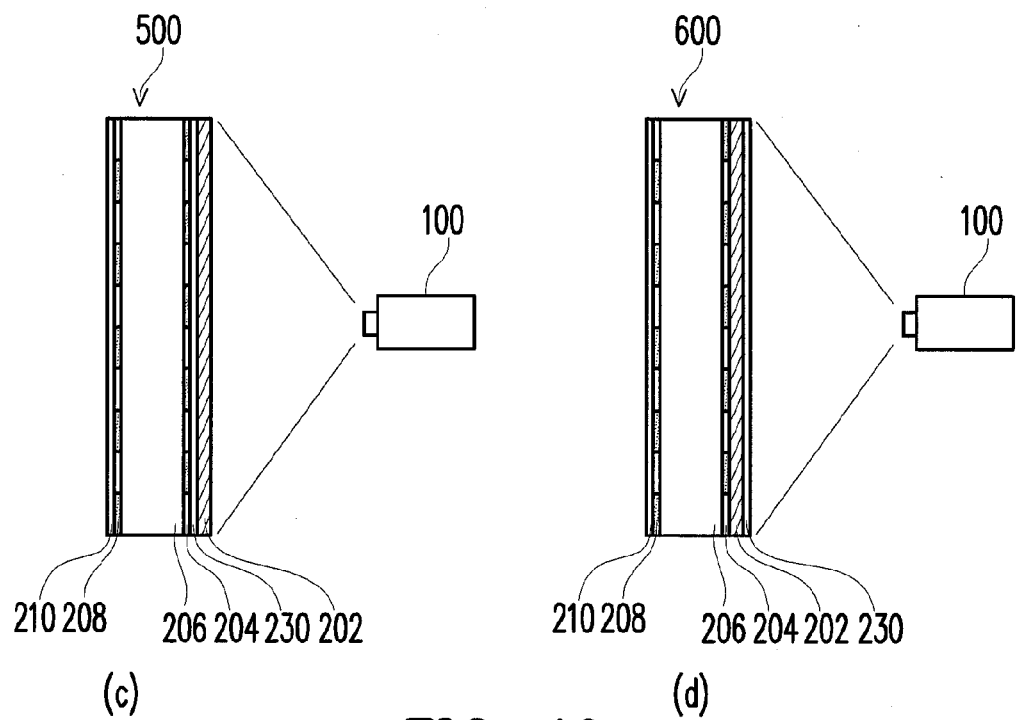

FIG. 19 is a structural schematic diagram of a stereo screen according to an exemplary embodiment of the disclosure. Referring to FIG. 19(a), the switching layer 230 of the stereo screen 300 is located between the second microretarder layer 208 and the spacer 206. Referring to FIG. 19(b), the switching layer 230 of the stereo screen 400 is located between the spacer layer 206 the first microretarder layer 204. Referring to FIG. 19(c), the switching layer 230 of the stereo screen 500 is located between the first microretarder layer 204 and the linear polarizer layer 202. Referring to FIG. 19(d), the switching layer 230 of the stereo screen 600 is disposed on the linear polarizer layer 202 at a side facing towards the projector 100, and when the switching layer 230 is switched to the 2D display mode, most of the light is directly reflected.

Figure 20:
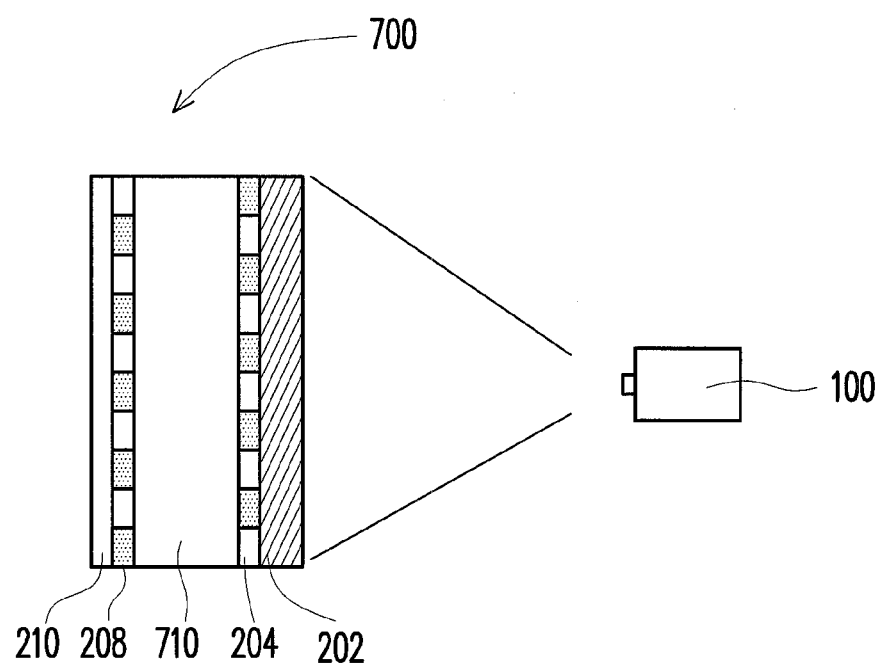
FIG. 20 is a structural schematic diagram of a stereo screen according to an exemplary embodiment of the disclosure.

Moreover, the switching layer can also be used to replace the spacer. FIG. 20 is a structural schematic diagram of a stereo screen according to an exemplary embodiment of the disclosure. Referring to FIG. 20, the stereo screen 700 is a variation of the structure of FIG. 13, where a switching layer 710 is used to replace the spacer layer 206. Since the spacer layer 206 is only used for providing a required interval space, the switching layer 710 can be used to replace the spacer layer 206, and a thickness of the switching layer 710 is the same with that of the spacer layer 206, and the switching layer 710, for example, directly contacts the first microretarder layer 204 and the second microretarder layer 208.

Other application variations are further described below. Since contents displayed on the stereo screen are diversified, in order to simultaneously display 2D and 3D display contents, the screen can be divided into a plurality of display units, which can be respectively controlled by switching layer units of the switching layer. Namely, a size of each of the switching layer units of the switching layer can be determined according to an actual design requirement. Each of the switching layer units can be independently controlled. In addition to the 2D/3D display switch for global area, a 2D/3D display switch for the localized area can also be achieved.

Figure 21:
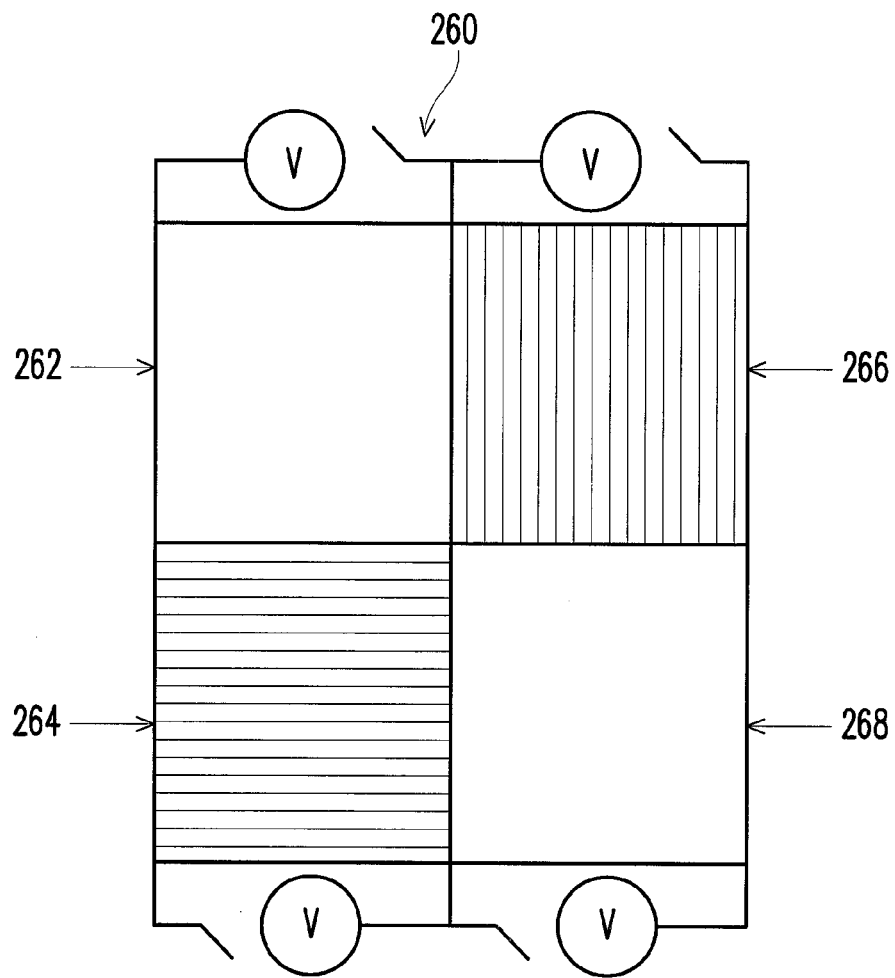
FIG. 21 is a schematic diagram illustrating a switching layer divided into a plurality of switching layer units according to an exemplary embodiment of the disclosure.

FIG. 21 is a schematic diagram illustrating a switching layer divided into a plurality of switching layer units according to an exemplary embodiment of the disclosure. Referring to FIG. 21, the switching layer 260 is, for example, divided into four switching layer units. Each of the switching layer units 262, 264, 266 and 268 is used for controlling the 2D and 3D switching separately. In this way, 2D images and 3D images are allowed to be simultaneously displayed on the screen. Image contents displayed on the screen are diversified. The four independent switching layer units 262, 264, 266 and 268 form a complete switching layer 260, and can be respectively switched to the transparent state or the opaque state. A size of the switching layer unit is determined by the designer, which even achieve a control degree of a pixel level.

Figure 22:
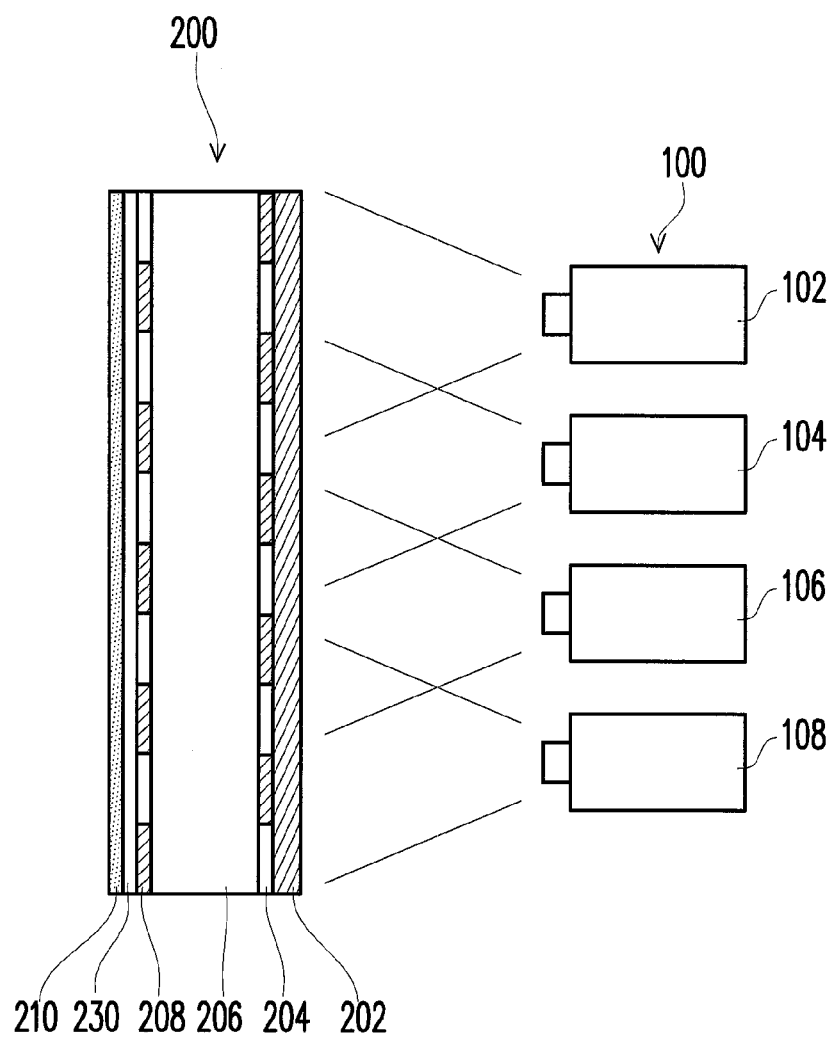
FIG. 22 is a schematic diagram of a projection system designed in response to multiple switching layer units according to an exemplary embodiment of the disclosure.

FIG. 22 is a schematic diagram of a projection system designed in response to multiple switching layer units according to an exemplary embodiment of the disclosure. Referring to FIG. 22, the projector 100 of the disclosure can be a single projector, or can be a projector array formed by a plurality of part projectors 102, 104, 106 and 108, which may increasing an image resolution, brightness and a projection size. Images projected on the screen by these projectors can be closely connected or partially overlapped to form an ultra-large display image (not shown).

Figure 23:
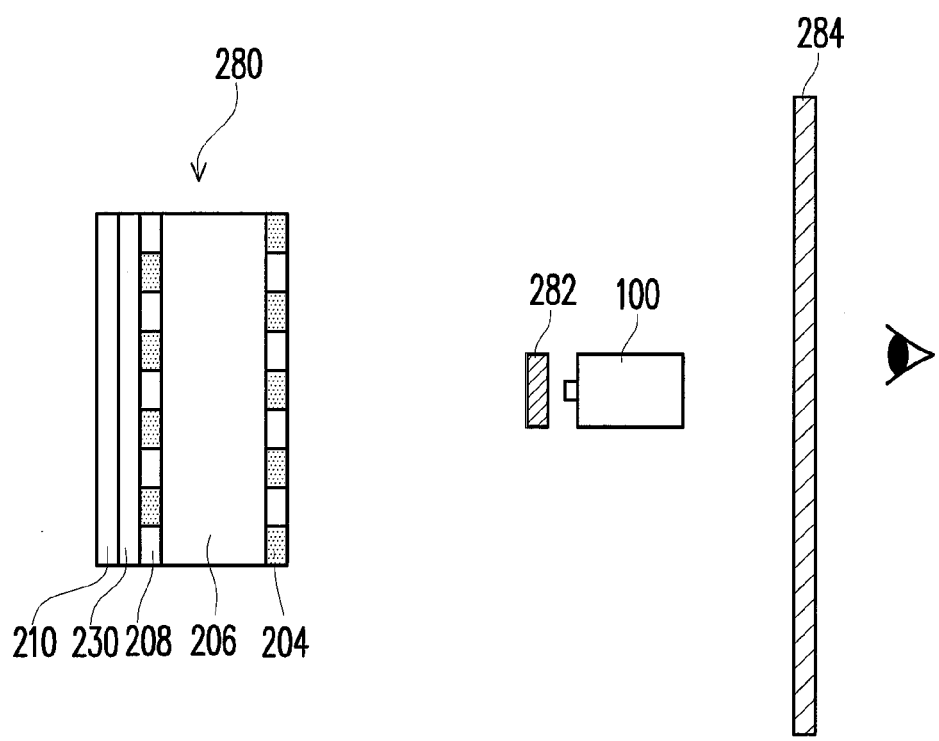
FIG. 23 is a structural schematic diagram of a projection system according to an exemplary embodiment of the disclosure.

According to the aforementioned 2D/3D display mechanism, a design of the linear polarizer layer 202 may also have different variations. FIG. 23 is a structural schematic diagram of a projection system according to an exemplary embodiment of the disclosure. Referring to FIG. 23, the linear polarizer layer 202 of the present exemplary embodiment can be directly disposed on the projector 100, though in this case, the structure of the whole projection system is required to be modified. In the structure of FIG. 16, the linear polarizer layer 202 is required to filter the image light of one of the polarization states to achieve the parallax barrier effect. In the embodiment of FIG. 23, the linear polarizer layer 202 is unnecessary to disposed on the stereo screen 280 at a side facing towards the projector 100, instead, a linear polarizer layer 282 is disposed on the projector 100, and the projector 100 projects an image with a linear polarization state (not shown), and the image includes a plurality of viewing-zone images. Since the linear polarizer layer 282 is locally disposed on the projector 100, compared to the structure of FIG. 16, the reflected image light scheduled to pass through the linear polarizer layer 202 (referring to FIG. 16) does not pass through the linear polarizer layer 282 to enter the observer's eyes in the present exemplary embodiment. In this condition, the 3D display effect cannot be achieved. In order to achieve the 3D display effect, another linear polarizer layer 284 can be disposed at a position relative to the observer's eyes, to filter the image light with one of the linear polarization states. In the present exemplary embodiment, if the linear polarizer layer 282 also has the P-polarization state, the result is the same to the aforementioned mechanism, the linear polarizer layer 284 is a P-type polarizer. The image light of the S-polarization state is filtered. However, the linear polarizer layer 284 can also be an S-type polarizer, and the image light of the S-polarization state can pass there through, which can also generate the 3D display effect.

In an exemplary embodiment, the projector can be mounted on the ceiling, and project images onto a wall perpendicular to the ceiling. The observer can sit on the floor to watch the stereo images come form the stereo screen, though this is not the only application method.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A projection autostereoscopic display, comprising:
   a projector, for projecting an image comprising a plurality of viewing-zone images; and a stereo screen, for receiving the image and reflecting the image back to an observing direction, wherein the stereo screen is an optical stacking layer, and counted from a side closed to the projector, the optical stacking layer comprises:

a linear polarizer layer, for receiving and polarizing the image;

a first microretarder layer, disposed behind the linear polarizer layer, and having a plurality of first microretarder column-shaped regions having a first phase retardation effect and a plurality of second microretarder column-shaped regions having a second phase retardation effect, wherein the first microretarder column-shaped regions and the second microretarder column-shaped regions are arranged in interlace;

a second microretarder layer, disposed behind the first microretarder layer by a distance, and having a plurality of third microretarder column-shaped regions having a third phase retardation effect and a plurality of fourth microretarder column-shaped regions having a fourth phase retardation effect, wherein the third microretarder column-shaped regions and the fourth microretarder column-shaped regions are arranged in interlace; and a reflection-type polarization-reserved diffuser layer, disposed behind the second microretarder layer for reflecting and diffusing the image into various directions while maintaining a polarization state of the image.

2. The projection autostereoscopic display as claimed in claim 1, wherein the stereo screen further comprises a switching layer located between the reflection-type polarization-reserved diffuser layer and the projector, the switching layer is switched to a transparent state during a three-dimensional display mode, and is switched to an opaque state during a two-dimensional display mode, wherein the transparent state refers to that the polarization state of the image is maintained after the image passes through the switching layer, and the opaque state refers to that the polarization state of the image is changed after the image passes through the switching layer.

3. The projection autostereoscopic display as claimed in claim 2, wherein the switching layer comprises at least one switching layer unit independently controlled and switched to the three-dimensional display mode or the two-dimensional display mode.

4. The projection autostereoscopic display as claimed in claim 1, wherein the first microretarder layer is directly adhered to the linear polarizer layer, and the second microretarder layer is directly adhered to the reflection-type polarization-reserved diffuser layer.

5. The projection autostereoscopic display as claimed in claim 1, wherein the microretarder column-shaped regions of the first microretarder layer are extended along a vertical direction of the stereo screen, and the microretarder column-shaped regions of the second microretarder layer are extended along the vertical direction of the stereo screen.

6. The projection autostereoscopic display as claimed in claim 1, wherein the microretarder column-shaped regions of the first microretarder layer are extended along a direction oblique to a vertical direction of the stereo screen by an angle, and the microretarder column-shaped regions of the second microretarder layer are extended along the direction oblique to the vertical direction of the stereo screen by the angle.

7. The projection autostereoscopic display as claimed in claim 1, wherein the projector comprises a plurality of part projectors, and each of the part projectors projects a part image to the stereo screen to form the image with an integral content.

8. The projection autostereoscopic display as claimed in claim 7, wherein the stereo screen further comprises a switching layer located between the reflection-type polarization-reserved diffuser layer and the projector, the switching layer has a plurality of independently controlled switching layer units corresponding to the part projectors, and is switched to a transparent state during a three-dimensional display mode, and is switched to an opaque state during a two-dimensional display mode.

9. The projection autostereoscopic display as claimed in claim 1, wherein the stereo screen further comprises a phase compensation plate located between the reflection-type polarization-reserved diffuser layer and the first microretarder layer.

10. The projection autostereoscopic display as claimed in claim 9, wherein the phase compensation plate comprises a reversed retardation plate.

11. The projection autostereoscopic display as claimed in claim 1, wherein the first to the fourth phase retardation effects are sequentially indicated by symbols from A to D, and the symbols A to D satisfy following conditions:

$$A+C=\pm m\pi, m=0, 1, 2, 3, \ldots;$$

$$B+D=\pm(n+\tfrac{1}{2})\pi, n=0, 1, 2, \ldots; \text{ and}$$

$$A-B=\pm(2k+1)\pi, k=0, 1, 2, 3, \ldots;$$

or $$B+D=\pm m\pi, m=0, 1, 2, 3, \ldots;$$

$$A+C=\pm(n+\tfrac{1}{2})\pi, n=0, 1, 2, \ldots; \text{ and}$$

$$A-B=\pm(2k+1)\pi, k=0, 1, 2, 3, \ldots$$

12. The projection autostereoscopic display as claimed in claim 1, wherein the linear polarizer layer has a linear polarization state, wherein a polarization state of a part of the image reflected by the reflection-type polarization-reserved diffuser layer and passing through one of the first microretarder column-shaped regions or the second microretarder column-shaped regions of the first microretarder layer is perpendicular to the linear polarization state, and a polarization state of a part of the image reflected by the reflection-type polarization-reserved diffuser layer and passing through another one of the first microretarder column-shaped regions or the second microretarder column-shaped regions of the first microretarder layer is different to the linear polarization state, and at least a part of the image passes through the linear polarizer layer.

13. A stereo screen, for receiving an image and reflecting the image back to an observing direction, the stereo screen comprising an optical stacking layer, and the optical stacking layer comprising:

a first microretarder layer, receiving the image having a linear polarization state, and having a plurality of first microretarder column-shaped regions having a first phase retardation effect and a plurality of second microretarder column-shaped regions having a second phase retardation effect, wherein the first microretarder column-shaped regions and the second microretarder column-shaped regions are arranged in interlace;

a second microretarder layer, disposed behind the first microretarder layer by a distance, and having a plurality of third microretarder column-shaped regions having a third phase retardation effect and a plurality of fourth microretarder column-shaped regions having a fourth phase retardation effect, wherein the third microretarder column-shaped regions and the fourth microretarder column-shaped regions are arranged in interlace; and a reflection-type polarization-reserved diffuser layer, disposed behind the second microretarder layer for reflecting and diffusing the image into various directions while maintaining a polarization state of the image.

14. The stereo screen as claimed in claim 13, wherein the optical stacking layer further comprises a switching layer located at a side of the reflection-type polarization-reserved diffuser layer for receiving the image, wherein the switching layer is switched to a transparent state during a three-dimensional display mode, and is switched to an opaque state during a two-dimensional display mode.

15. The stereo screen as claimed in claim 14, wherein the switching layer comprises at least one switching layer unit independently controlled and switched to the three-dimensional display mode or the two-dimensional display mode.

16. The stereo screen as claimed in claim 14, wherein the optical stacking layer comprises a linear polarizer layer for receiving the image with a non-polarization state and generating the image with the linear polarization state to the first microretarder layer.

17. The stereo screen as claimed in claim 13, wherein the first microretarder layer is directly adhered to the linear polarizer, and the second microretarder layer is directly adhered to the reflection-type polarization preserved diffuser.

18. The stereo screen as claimed in claim 13, wherein the microretarder column-shaped regions of the first microretarder layer are extended along a vertical direction of the stereo screen, and the microretarder column-shaped regions of the second microretarder layer are extended along the vertical direction of the stereo screen.

19. The stereo screen as claimed in claim 13, wherein the microretarder column-shaped regions of the first microretarder layer are extended along a direction oblique to a vertical direction of the stereo screen by an angle, and the microretarder column-shaped regions of the second microretarder layer are extended along the direction oblique to the vertical direction of the stereo screen by the angle.

20. The stereo screen as claimed in claim 13, wherein the stereo screen further comprises a phase compensation plate located between the reflection-type polarization-reserved diffuser layer and the first microretarder layer.

21. The stereo screen as claimed in claim 20, wherein the phase compensation plate comprises a reversed retardation plate.

22. The stereo screen as claimed in claim 13, wherein a width of the first microretarder column-shaped regions and a width of the second microretarder column-shaped regions of the first microretarder layer are designed proportional to a width of the third microretarder column-shaped regions and a width of the fourth microretarder column-shaped regions of the second microretarder layer according to a projection position of the image and a pixel shape and a size of the image.

23. The stereo screen as claimed in claim 13, wherein the first to the fourth phase retardation effects are sequentially indicated by symbols from A to D, and the symbols A to D satisfy following conditions:

$A+C=\pm m\pi, m=0, 1, 2, 3, \ldots;$ $B+D=\pm(n+\frac{1}{2})\pi, n=0, 1, 2, \ldots;$ and $A-B=\pm(2k+1)\pi, k=0, 1, 2, 3, \ldots;$ or $B+D=\pm m\pi, m=0, 1, 2, 3, \ldots;$ $A+C=\pm(n+\frac{1}{2})\pi, n=0, 1, 2, \ldots;$ and $A-B=\pm(2k+1)\pi, k=0, 1, 2, 3, \ldots$ 24. A projection autostereoscopic display, comprising:
a linear polarizer layer, located at an observing position;
a projector, for projecting an image having a linear polarization state, wherein the image comprises a plurality of viewing-zone images; and
a stereo screen, for receiving the image and reflecting the image to the linear polarizer layer, wherein the stereo screen comprises an optical stacking layer, and counted from a side closed to the projector, the optical stacking layer comprises:
a first microretarder layer, for receiving the image having the linear polarization state, wherein the first microretarder layer has a plurality of first microretarder column-shaped regions having a first phase retardation effect and a plurality of second microretarder column-shaped regions having a second phase retardation effect, wherein the first microretarder column-shaped regions and the second microretarder column-shaped regions are arranged in interlace;
a second microretarder layer, disposed behind the first microretarder layer by a distance, wherein the second microretarder layer has a plurality of third microretarder column-shaped regions having a third phase retardation effect and a plurality of fourth microretarder column-shaped regions having a fourth phase retardation effect, wherein the third microretarder column-shaped regions and the fourth microretarder column-shaped regions are arranged in interlace; and
a reflection-type polarization-reserved diffuser layer, disposed behind the second microretarder layer for reflecting and diffusing the image into various directions while maintaining the polarization state of the image.

25. The projection autostereoscopic display as claimed in claim 24, wherein the stereo screen further comprises a switching layer located between the reflection-type polarization-reserved diffuser layer and the linear polarizer layer, the switching layer is switched to a transparent state during a three-dimensional display mode, and is switched to an opaque state during a two-dimensional display mode, wherein the transparent state refers to that the polarization state of the image is maintained after the image passes through the switching layer, and the opaque state refers to that the polarization state of the image is changed after the image passes through the switching layer.

26. The projection autostereoscopic display as claimed in claim 25, wherein the switching layer comprises at least one switching layer unit independently controlled and switched to the three-dimensional display mode or the two-dimensional display mode.

* * * * *